(12) United States Patent
Griffin et al.

(10) Patent No.: US 10,471,666 B2
(45) Date of Patent: Nov. 12, 2019

(54) DYNAMIC ADDITIVE MANUFACTURING SYSTEM

(71) Applicant: Kanawha Automation, LLC, Loveland, CO (US)

(72) Inventors: Eric Griffin, Fort Collins, CO (US); Charles Buckley, Ault, CO (US)

(73) Assignee: Kanawha Automation, LLC, Loveland, CO (US)

( * ) Notice: Subject to any disclaimer, the term of this patent is extended or adjusted under 35 U.S.C. 154(b) by 292 days.

(21) Appl. No.: 15/027,112

(22) PCT Filed: Oct. 3, 2014

(86) PCT No.: PCT/US2014/059182
§ 371 (c)(1),
(2) Date: Apr. 4, 2016

(87) PCT Pub. No.: WO2015/051332
PCT Pub. Date: Apr. 9, 2015

(65) Prior Publication Data
US 2016/0236419 A1    Aug. 18, 2016

Related U.S. Application Data

(60) Provisional application No. 61/887,227, filed on Oct. 4, 2013.

(51) Int. Cl.
*B29C 67/00*    (2017.01)
*B32B 41/00*    (2006.01)
(Continued)

(52) U.S. Cl.
CPC ........ *B29C 67/0088* (2013.01); *B29C 64/106* (2017.08); *B29C 64/124* (2017.08);
(Continued)

(58) Field of Classification Search
CPC ......... B33Y 10/00; B33Y 30/00; B33Y 50/00; B29C 67/0088
See application file for complete search history.

(56) References Cited

U.S. PATENT DOCUMENTS

| | | |
|---|---|---|
| 4,263,647 A | 4/1981 | Merrell et al. |
| 4,403,302 A | 9/1983 | Young et al. |

(Continued)

FOREIGN PATENT DOCUMENTS

| | | |
|---|---|---|
| WO | 2008120183 A1 | 10/2008 |
| WO | 2012143785 A1 | 10/2012 |

*Primary Examiner* — Jacob T Minskey
*Assistant Examiner* — Melody Tsui
(74) *Attorney, Agent, or Firm* — Santangelo Law Offices, P.C.

(57) ABSTRACT

A dynamic manufacturing system such as for the additive manufacture of a fabrication item with multiformative capabilities presents a processor (29) that can refine movement, instructions, or data to achieve greater manufacturing efficiency and substantially uninterruptive change between formative process elements (24) or capabilities with simple user input (28) or indications. Optimization of movements, deposition of material, positioning, variant repositioning for next item layers during fabrication are provided in manners where the functions can be self contained such as in a 3D printer or the like and can be accomplished without significant interruptions to traditional processing times or even in shorter times through the improved transformations.

13 Claims, 10 Drawing Sheets

(51) Int. Cl.
   *B29C 64/106* (2017.01)
   *B29C 64/124* (2017.01)
   *B29C 64/141* (2017.01)
   *B29C 64/20* (2017.01)
   *B29C 64/386* (2017.01)
   *B33Y 30/00* (2015.01)
   *B33Y 50/02* (2015.01)
   *B29K 105/00* (2006.01)

(52) U.S. Cl.
   CPC ............ *B29C 64/141* (2017.08); *B29C 64/20* (2017.08); *B29C 64/386* (2017.08); *B32B 41/00* (2013.01); *B29K 2105/0067* (2013.01); *B29K 2105/251* (2013.01); *B33Y 30/00* (2014.12); *B33Y 50/02* (2014.12)

(56) References Cited

U.S. PATENT DOCUMENTS

| | | |
|---|---|---|
| 4,408,299 A | 10/1983 | Young |
| 4,466,770 A | 8/1984 | Peroutky |
| 4,937,759 A | 6/1990 | Vold |
| 5,288,209 A | 2/1994 | Therrien et al. |
| 5,325,307 A | 6/1994 | Akashi |
| 5,402,351 A | 3/1995 | Batchelder et al. |
| 5,453,933 A | 9/1995 | Wright et al. |
| 5,529,473 A | 6/1996 | Lawton et al. |
| 5,682,319 A | 10/1997 | Boland et al. |
| 5,682,453 A | 10/1997 | Daniel et al. |
| 5,892,345 A | 4/1999 | Olsen |
| 6,007,230 A | 12/1999 | Beckett et al. |
| 6,129,872 A * | 10/2000 | Jang ................. B29C 41/36 264/245 |
| 6,311,098 B1 | 1/2001 | Higasayama |
| 6,192,283 B1 | 2/2001 | Holowko |
| 6,317,646 B1 | 11/2001 | de Caussin et al. |
| 6,459,951 B1 | 10/2002 | Griffith et al. |
| 6,547,995 B1 | 4/2003 | Comb |
| 6,922,607 B2 | 7/2005 | Yamazaki et al. |
| 7,069,185 B1 | 6/2006 | Wilson et al. |
| 7,334,970 B2 | 2/2008 | Kozak |
| 7,450,127 B2 | 11/2008 | Hong et al. |
| 7,599,813 B2 | 10/2009 | Grupp |
| 7,665,200 B1 | 2/2010 | Shimooka |
| 7,824,001 B2 | 5/2010 | Fienup et al. |
| 7,853,351 B2 | 12/2010 | Corey |
| 8,260,453 B2 | 9/2012 | Otsuki et al. |
| 8,509,940 B2 | 8/2013 | Gu et al. |
| 8,554,502 B2 | 10/2013 | Hon et al. |
| 8,573,097 B2 | 11/2013 | Dixon et al. |
| 8,644,978 B1 | 2/2014 | Heath et al. |
| 8,678,805 B2 | 3/2014 | Vermeer et al. |
| 8,688,258 B2 | 4/2014 | Miller |
| 8,712,577 B2 | 4/2014 | Gu et al. |
| 8,719,212 B2 | 5/2014 | Khoukhi |
| 8,736,212 B2 | 5/2014 | Sandhu et al. |
| 8,761,918 B2 | 6/2014 | Silverbrook |
| 8,761,920 B2 | 6/2014 | Gu et al. |
| 8,777,602 B2 | 7/2014 | Vemeer et al. |
| 8,807,721 B2 | 8/2014 | Nozawa et al. |
| 8,810,122 B2 | 8/2014 | Foret et al. |
| 8,814,770 B2 | 8/2014 | Schumander |
| 8,815,141 B2 | 8/2014 | Swanson et al. |
| 8,819,228 B2 | 8/2014 | Ramamurthy |
| 8,676,372 B1 | 9/2014 | Bolin et al. |
| 8,821,084 B2 | 9/2014 | Chen |
| 8,824,777 B2 | 9/2014 | Choi et al. |
| 8,827,684 B1 | 9/2014 | Schumacher et al. |
| 8,836,988 B2 | 9/2014 | Gravely, Jr. et al. |
| 8,838,682 B2 | 9/2014 | Gerdes et al. |
| 2002/0068990 A1 | 6/2002 | Yamazaki et al. |
| 2003/0033050 A1 | 2/2003 | Yutkowitz |
| 2003/0050725 A1 | 3/2003 | Dirnfeldner et al. |
| 2003/0114954 A1 | 6/2003 | Inagaki et al. |
| 2003/0120376 A1 | 6/2003 | Shibata et al. |
| 2003/0192865 A1 | 10/2003 | Cole et al. |
| 2003/0204283 A1 | 10/2003 | Picard et al. |
| 2004/0181307 A1 | 9/2004 | Hirai et al. |
| 2005/0154488 A1 | 7/2005 | Esterling |
| 2006/0151445 A1 | 7/2006 | Schneider |
| 2007/0070038 A1 | 3/2007 | Hoffberg |
| 2008/0113293 A1 | 5/2008 | Shkolnik et al. |
| 2008/0231731 A1 | 9/2008 | Hull et al. |
| 2008/0234857 A1 | 9/2008 | Endo et al. |
| 2009/0112357 A1 | 4/2009 | Hammond et al. |
| 2009/0267269 A1 | 10/2009 | Lim et al. |
| 2010/0021580 A1 | 1/2010 | Swanson et al. |
| 2013/0009338 A1 * | 1/2013 | Mayer .................. B29C 64/106 264/241 |
| 2013/0015596 A1 | 1/2013 | Mozeika et al. |
| 2013/0164960 A1 | 6/2013 | Swanson et al. |

\* cited by examiner though additive manufacturing systems # DYNAMIC ADDITIVE MANUFACTURING SYSTEM This is the United States National Phase of International Patent Application Number PCT/US14/59182, filed 3 Oct. 2014 (published as Publication No. WO 2015/051332), which claims priority to and the benefit of US Provisional Application No. 61/887227, filed Oct. 4, 2013, each said application hereby incorporated herein by reference in its entirety.

TECHNICAL FIELD

This invention relates to additive manufacturing systems and the like, including devices such as are commonly referred to as 3D printers. It especially relates to manufacturing systems that can be made dynamic and can present differing capabilities, can improve processes, and can provide better manufactured items. It especially relates to manufacturing systems that utilize dedicated, specialized processors for more efficient manufacturing, including both abilities to rapidly switch between formative capabilities without interruption and abilities to provide a more refined fabricated item.

BACKGROUND

Previous manufacturing systems have provided a number of features. In the area of additive manufacturing, however, systems have often been unnecessarily limited by aspects such as the way in which the actual additive manufacturing is physically achieved, and often the singular process capability presented by a particular 3D printer or the like. By design additive manufacturing systems move a process element or head in rectilinear motion to fabricate the item. Movement consists of a series of left-right, fore-aft step motions that are determined to make the desired item. This type of movement can at times limit the accuracy of the end result and make the fabricated item less than optimal. Accordingly, better movement to achieve a better end resulting fabricated item have been desired, however, the limits of what was perceived as mandated stepper motor motions in an X and Y direction have been viewed as limited the possibilities for most additive manufacturing systems. For example, for typical 3D printers, as shown in U.S. Pat. No. 8,824,777, traditional movement is still used even when shrinkage is factored into the end result.

Previous systems have either had instructions manually describe their motions, or have generated commands from a computer program that were then loaded onto the processor controller for execution. Based on the instructions, the control processor activated motors corresponding to an axis moving either the operational head or the part itself. The commands could also be sent in parallel causing both the part and operational head to move simultaneously. In general terms, the control mechanism was identical irrespective of what sort of operational head was mounted. The program steps defined a path that could be followed by any operational head mounted to an axis. The operational envelope of the system was defined by how far the system could move down an axis until it reached its limit of travel.

Similarly, additive manufacturing systems have evolved often as limited systems that were configured for only one specific (sometimes proprietary) source material, or one type of processing element and even one specific head. Such systems had little flexibility in accommodating other processing elements or other additive layup materials. For example, for typical ink printers, as shown in U.S. Pat. No. 8,807,721, a cartridge is shown with replacement possible, but such is generally limited to only one type of cartridge and cannot accommodate the full scope of alterations desired. Even on systems where it might have been theoretically possible change a process element, such changes were not able to be accomplished during the fabrication of the item. Instead manual change out, usually with a complete reconfiguration and reboot with new drivers and even calibration, was required.

None of the existing systems achieved the level of fabrication optimization or allowed for the efficiency of fabrication that was desired in these regards. Not only has it been difficult and only for trained technicians to change process capabilities, but the specific movements and end result fabrications have been perceived as all that was possible. Users simply accepted that it was necessarily time consuming to switch capabilities on a given machine, that new fabrication data had to be entered upon any change out, and that movements had to be the way they were because of the constraints of the movement system itself. The present system aims to solve these and other problems by providing new capabilities and new processing techniques that can be employed to overcome the limits of preexisting systems.

DISCLOSURE OF INVENTION

Accordingly, the present invention presents a variety of new techniques and capabilities in various embodiments that can be employed to achieve new functionalities alone or in combination to present a system that can dynamically achieve an additive manufacturing process, multiple additive manufacturing processes, or other manufacturing or fabrication processes to overcome limits and inadequacies of prior systems. This invention presents many embodiments through which enhanced additive manufacturing processes can be optimally achieved and enhanced additive or other manufacturing systems can be presented for fabrication of a desired.

One goal of embodiments of the present invention involves methods for and systems to achieve dynamic additive manufacture of a fabrication item. Embodiments can provide layup transformation and command transformation that works with existing indications and configurations to seamlessly provide better results. In one embodiment, there might be a movement transformation processor within the system to alter initial or traditional commands for a better result. Another embodiment can provide a command transformation processor that takes an initial, again, perhaps traditional, command and appropriately transform it to better movement or a better result. Yet another embodiment can provide a proactive control processor that assesses movements that may even not have been made yet to more optimally do present movement so the end result or even the end layup is improved.

Further, another goal of embodiments of the invention may be directed towards substantially uninterruptive methods for and systems that achieve switching between formative process capabilities such as between differing print heads, differing manufacturer elements, and even entirely different processes even to accommodate removal, milling, or other processes. In one configuration, the head might be a motorized spindle that has a cutting bit. In another configuration, it could have a vinyl cutter. In another it could have a laser cutter. In another it could have a heated extruder such as for 3D printing or the like. In embodiments, the processor can allow an operator or even just a relatively unskilled user having no particular element or system reconfiguration or reload expertise to merely select which formative process capability is desired and then switch to a desired operation. Another aspect of embodiments of the invention may be directed towards a common program to manage all the various types of heads that can be mounted within a common operational envelope. The program could allow an operator to select which machine head is operational, then could provide the operational inputs for that head. Another aspect of embodiments of the invention is the implementation of the input to the device based on a touchscreen or the like. The program defined above could provide discrete areas on the screen with the operational inputs. The operator could then touch the screen over those options. The computer program could then pass the options to the control processor. Significantly this can even be accomplished seamlessly and even without any substantial interruption in the overall ongoing fabrication process.

Yet other goals of embodiments of the invention include abilities to speed up fabrication processing through better movement, more seamless changes, and even by more optimal variations in activity to move to manufacturing the next layer or stage of the item to be fabricated. Embodiments can allow for varying layer repositioning according to calculated optimization for the stage of the item that has been fabricated or otherwise just for better speed. In some embodiments, variations in layer repositioning can be altered stereolithographic additive manufacturing processes and system and even for bottom-up photosolidification activities as use in additive manufacturing and the like. In other embodiments, changes to fabrication processes can be automatically tuned to optimize any of a variety of variables and such can be provided in a manner that is available to simply user input. In embodiments the system can be made to be mere user configurable without any need for technically challenging reconfigurations or the like.

In the additive manufacturing area, it is a goal of the invention to present an enhanced additive manufacturing system or an enhanced 3D printer system that can optimize movements, optimize manufacturing process options, and even optimize the resulting fabricated item. These can even be accomplished in a manner that is seamless to a user or operator.

MODE(S) FOR CARRYING OUT THE INVENTION

As mentioned, the invention may be carried out in a wide variety of ways, and the examples discussed herein are simply that—examples. The present invention includes a variety of aspects, which may be combined in different ways. As such the following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application. Although they may certainly assist in enabling practice of the invention, it should be understood that a wide variety of applications are possible without departing from the scope of the invention. Broader, more inclusive concepts are part of what this invention is. Claims and the scope of the invention should be understood as not limited to only the explicitly discussed examples; other examples and options are within the scope of the invention.

Figure 1:
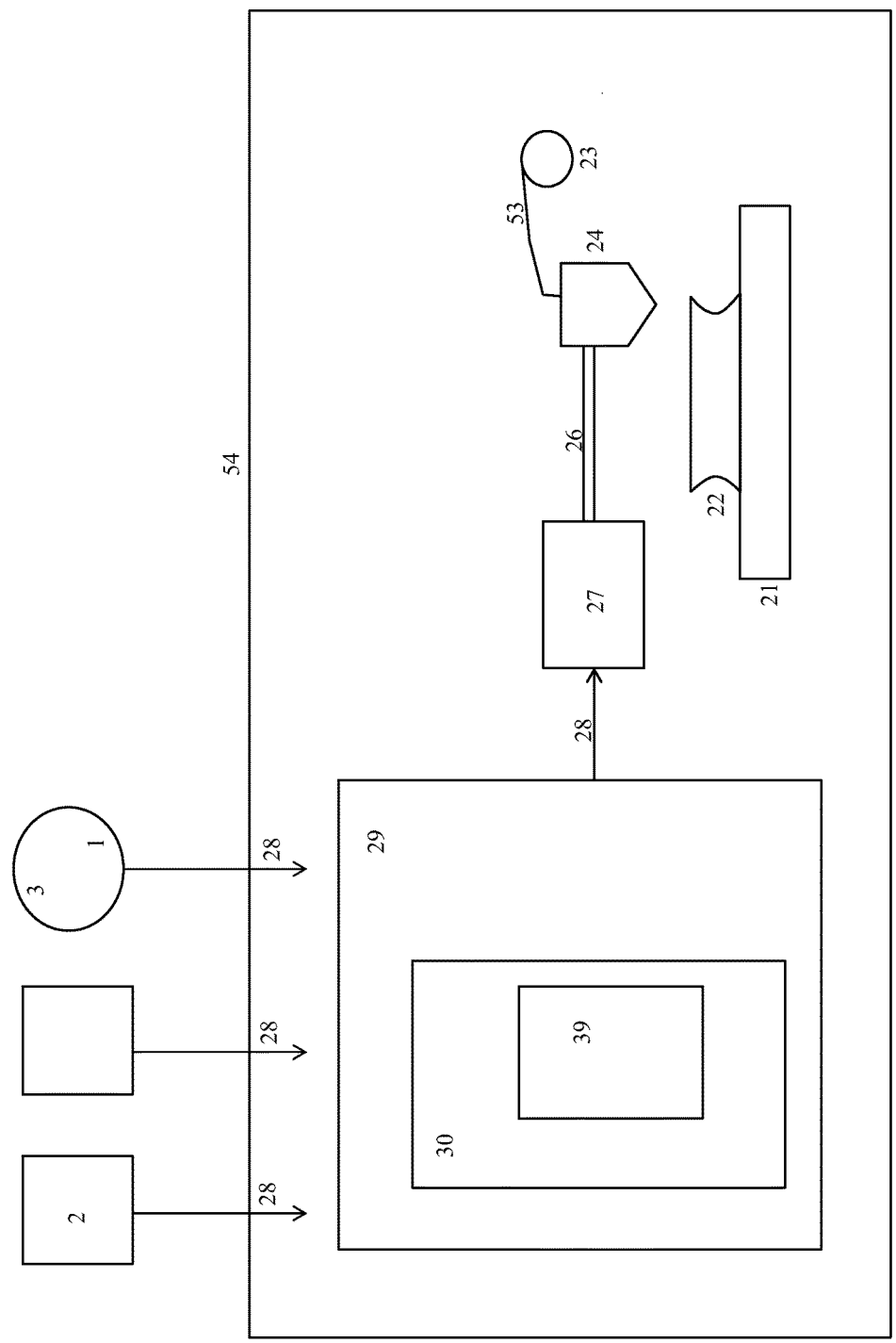
FIG. 1 shows a conceptual block diagram of an embodiment of the invention that includes a movement transformation capability.
Figure 2:
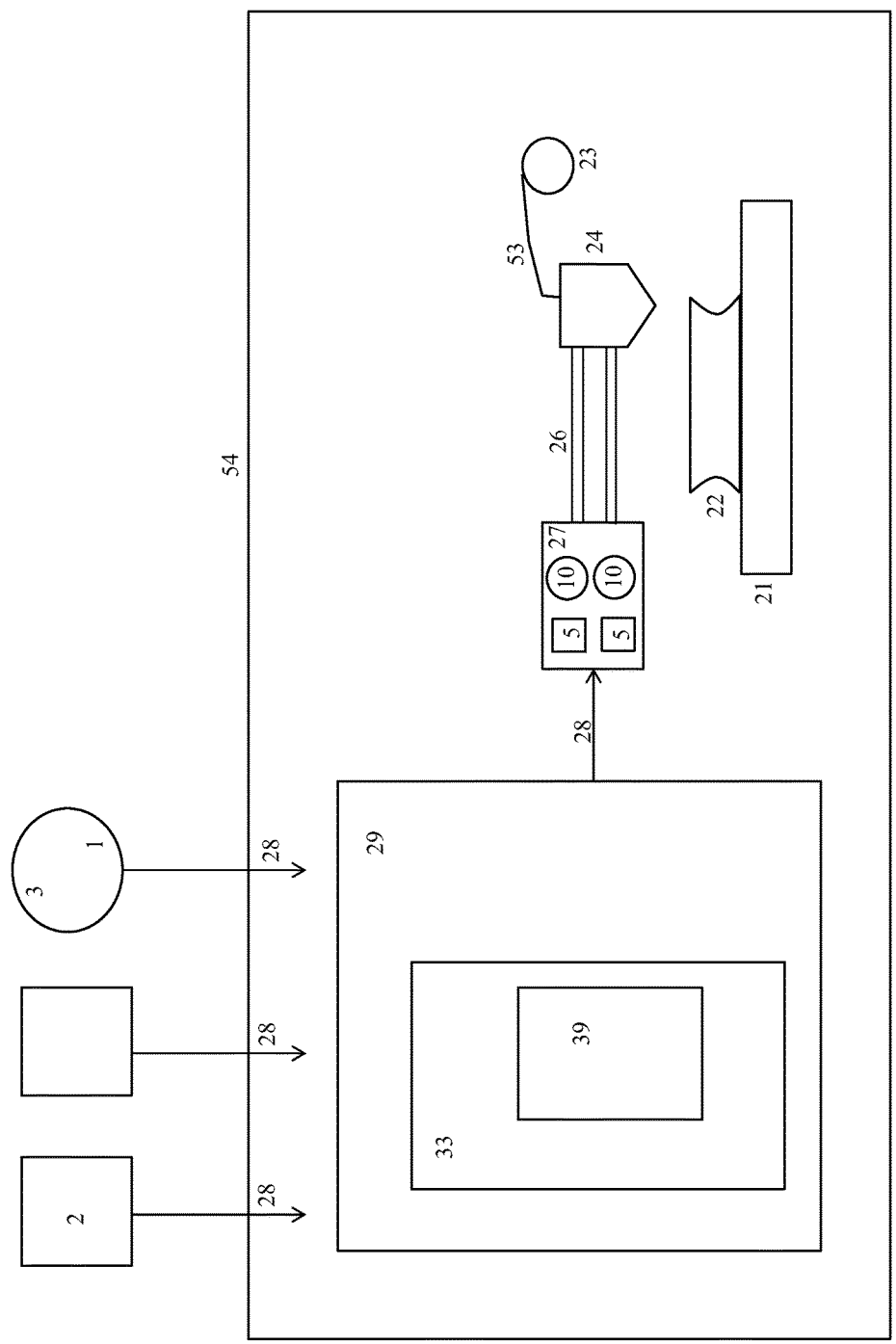
FIG. 2 shows a conceptual block diagram of an embodiment of the invention that includes a command transformation capability.
Figure 3:
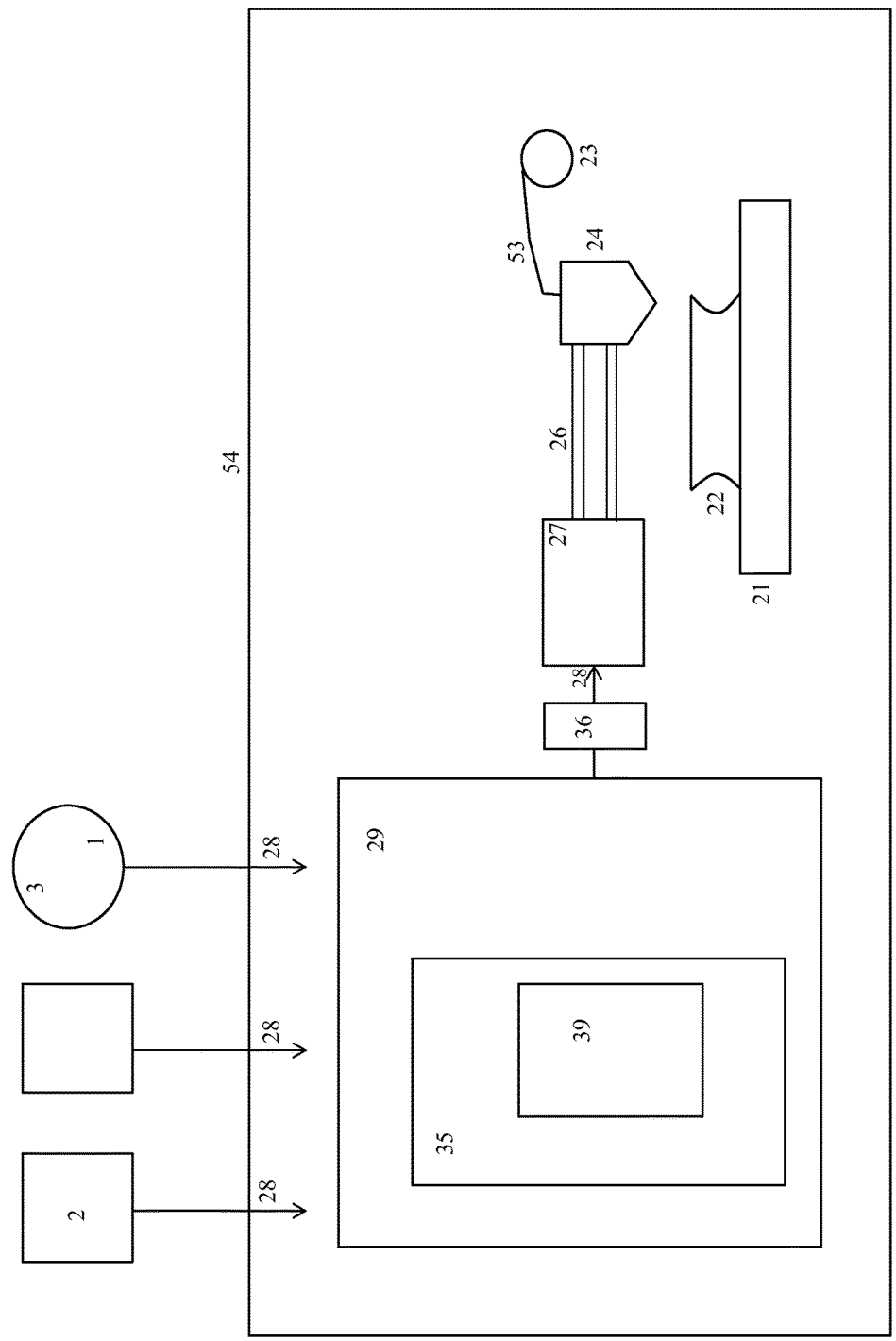
FIG. 3 shows a conceptual block diagram of an embodiment of the invention that includes a proactive control capability.
Figure 5:
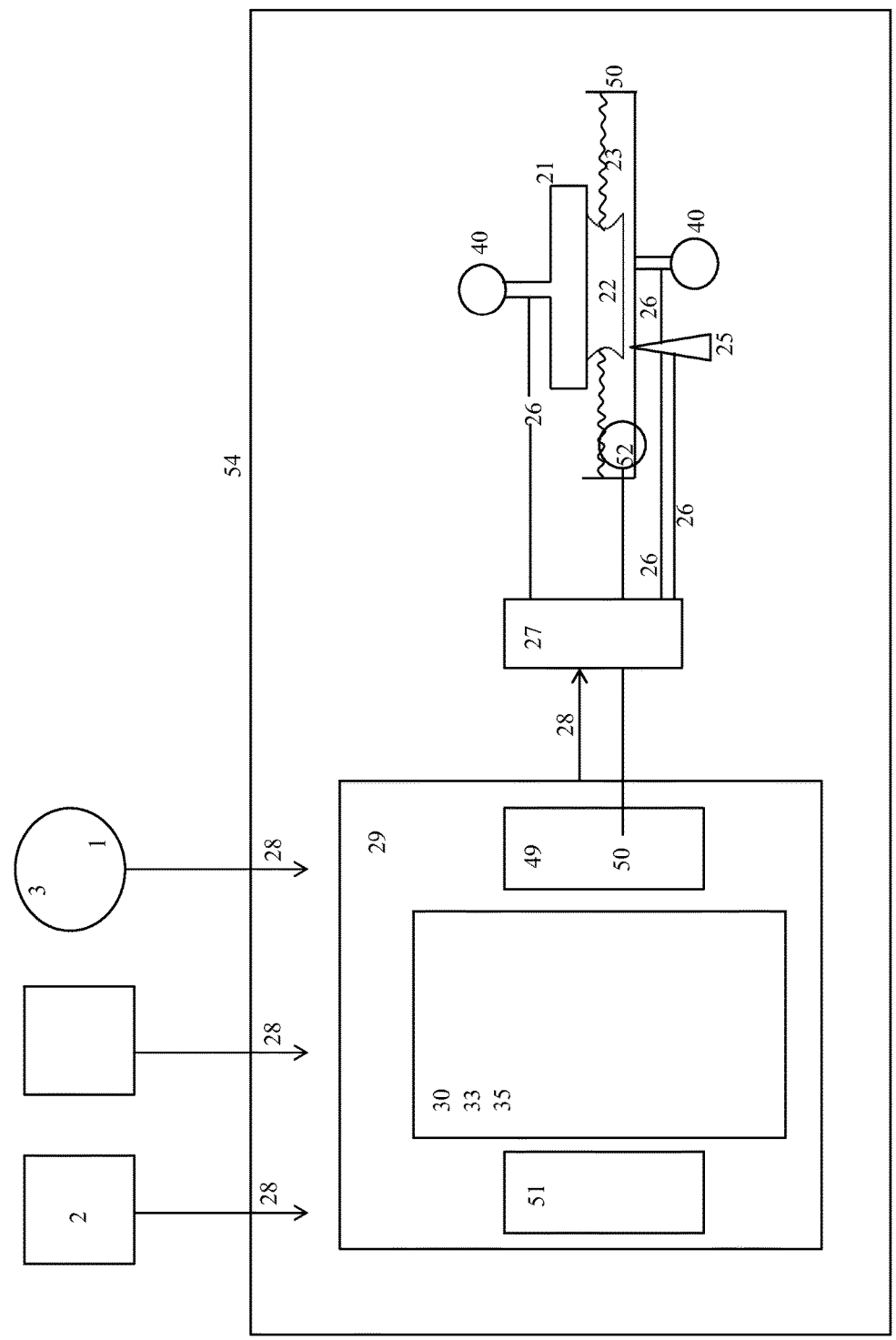
FIG. 5 shows a conceptual block diagram of an embodiment of the invention that includes a photosolidification capability.
Figure 6:
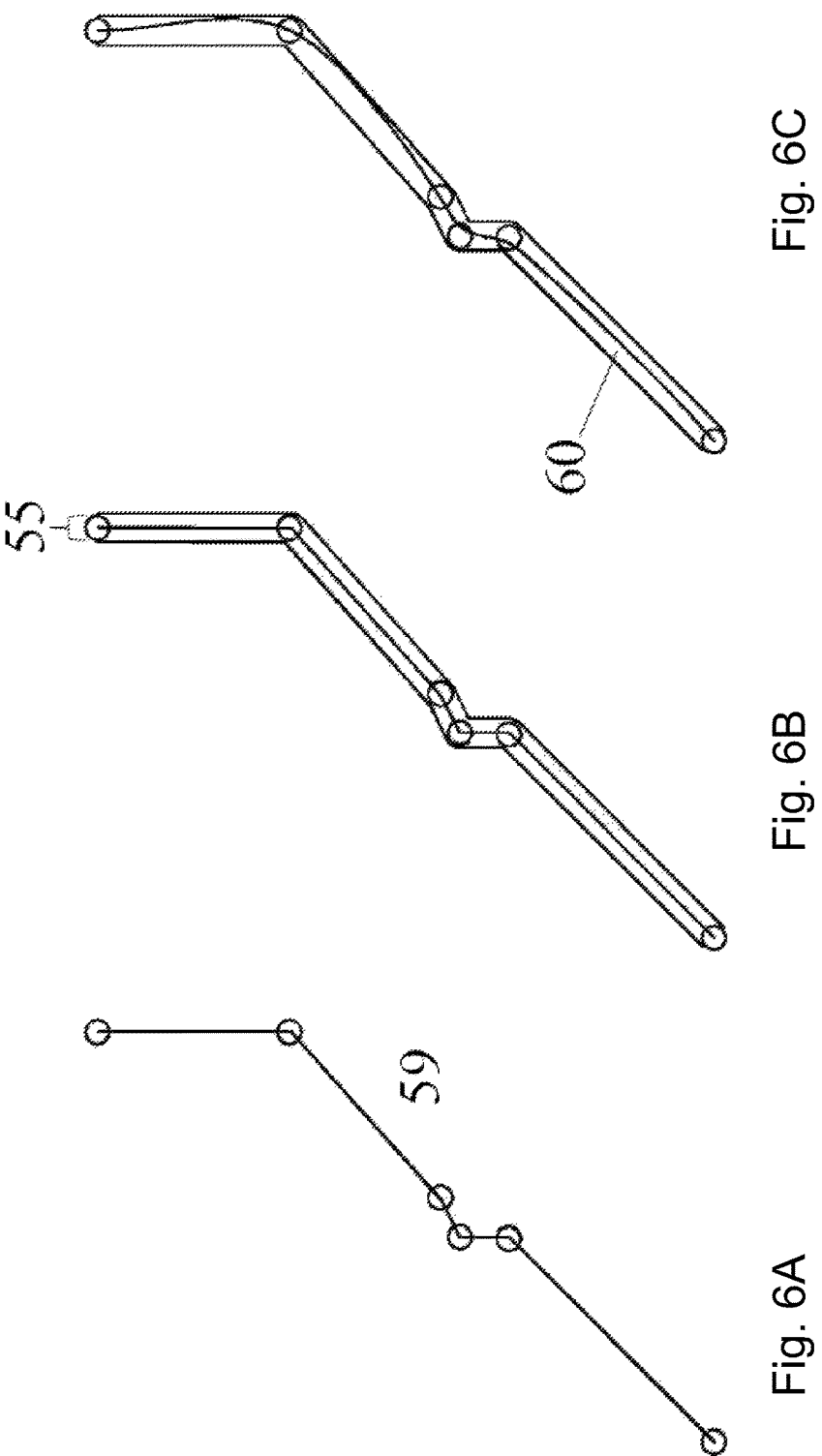
FIGS. 6A-6C show conceptual block diagrams of an embodiment of the invention that shows a possible movement transformation in three dimensions.
Figure 7:
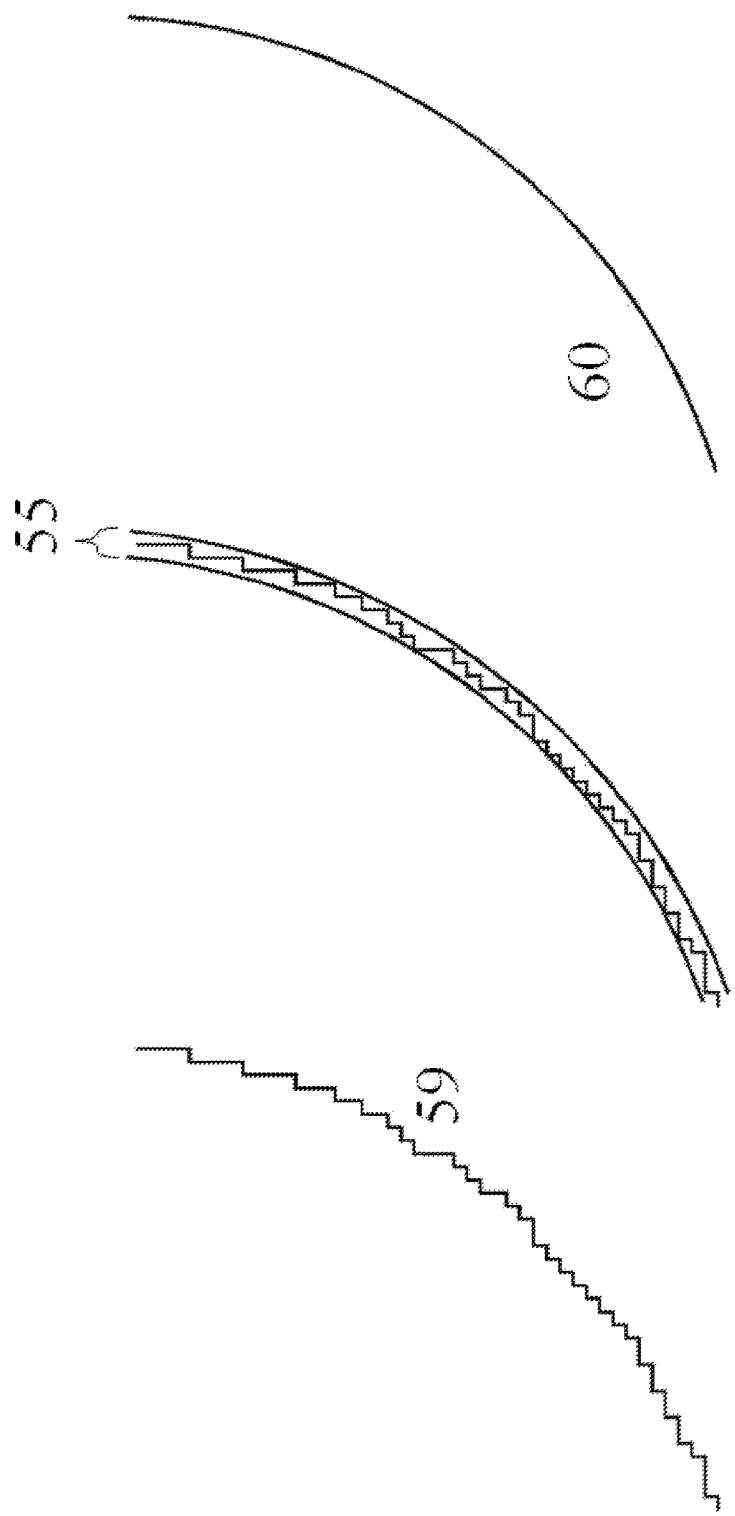
FIGS. 7A-7C show conceptual block diagrams of an embodiment of the invention that shows a possible movement transformation in two dimensions.

The present invention discloses dynamic additive manufacturing systems (54) by which a fabrication item can be formed. It discusses both apparatuses that may be used to manufacture fabrication items, as well as methods by which such manufacturing may be accomplished. Referring to FIGS. 1, 2, and 3, basic aspects of some embodiments of the invention can be understood. Embodiments of the invention can include a fabrication support (21) on which a fabrication item (22) may be formed. The support (21) may be a column, a work table (9) or it may be a flat platform. It may be fixed or movable. Anything capable of holding a fabricated item may suffice. Embodiments of the invention may include an additive material source (23). An additive material source (23) may be a vat or container (50) in which a fabrication item is formed, may be a linearly fed material (53) as shown in FIG. 1, or otherwise. A linearly fed material can be such as a string of meltable material that undergoes melting and extrusion from a formative process element (24). It can also be a powder flowing to a formative process element (24). In stereolithographic fabrication systems, there can be a laser or other element that serves as a photosolidification formative process element (25) (as shown in FIG. 5) that causes the desired material to solidify at precise locations to fabricate the item (22) in the desired shape.

Figure 4:
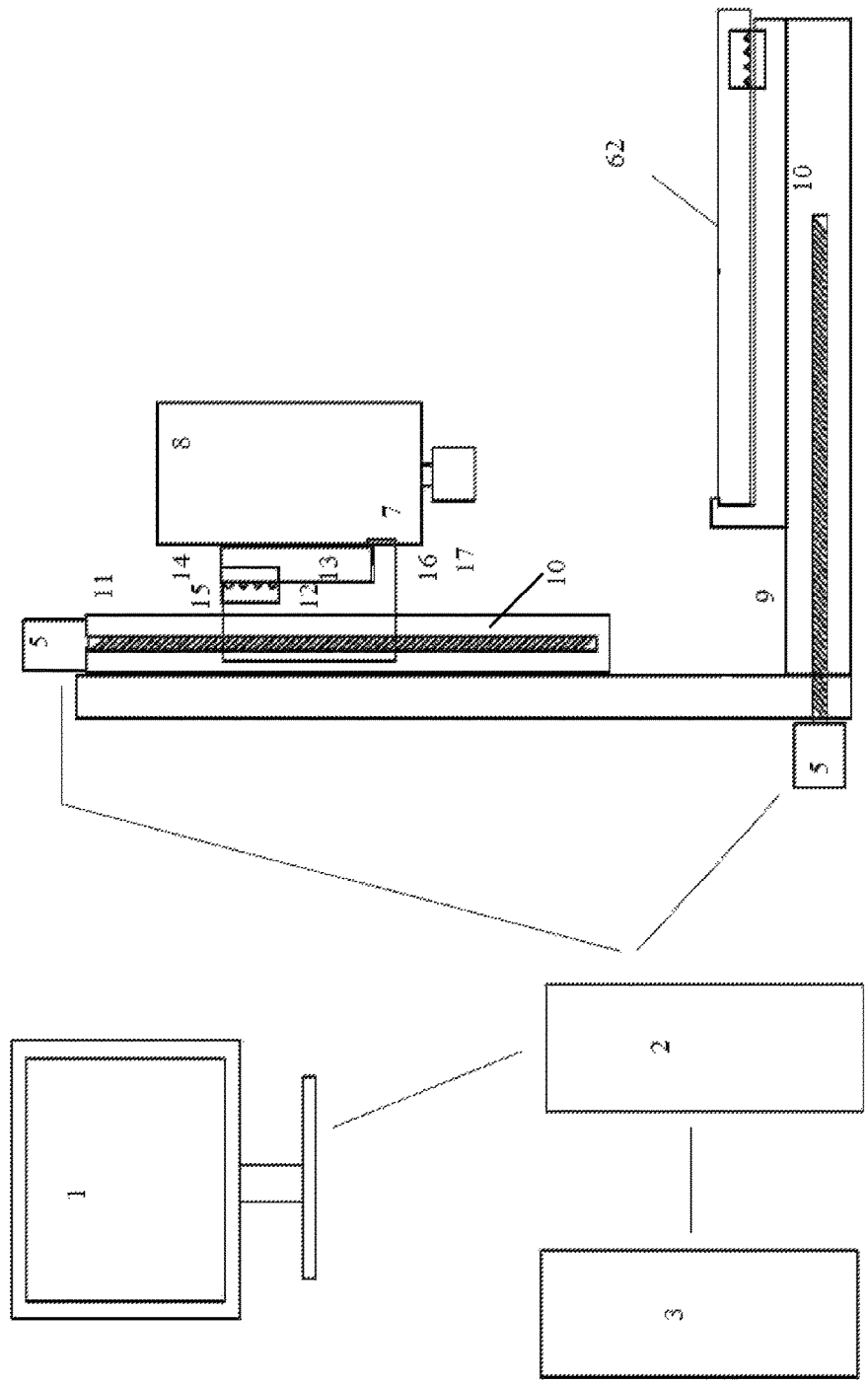
FIG. 4 shows a front view of one type of fabrication system.

The present disclosure includes a method for controlling a manufacturing system using an interface, perhaps such as a touchscreen monitor, in conjunction with other input devices to manage interchangeable heads of various capabilities. FIG. 4 is a front view of a representative system in use with computer (2), where the system may be a manufacturing system that may be used to machine models and/or finished work pieces. As shown, the system can include a touchscreen (1), a computer (2), a keyboard (3), a drive controller (4), a milling machine (7), and an interchangeable head (8). The milling machine (7) can include a guide rail system configured to move interchangeable head (8) in a vertical Z direction based on signals provided from a drive controller (4). The horizontal X-Y plane may be a plane defined by an X-axis and a Y-axis, where the X-axis, the Y-axis, and the Z-axis are orthogonal to each other. Examples of suitable heads for interchangeable head (8) can include 3D print heads, wood routers, motorized spindles, vinyl cutters, laser cutters, touch probes, 3D extruder heads, as well as others.

Prior to a build or other operation, computer (2) may receive a digital representation of a 3D model. Computer (2) can be one or more computer-based systems that communicate with the system (e.g., with drive controller (4)). Computer (2) may be separate from the system, or alternatively may be an internal component of the system. Upon receipt of the digital representation of some type of 3D model, computer (2) can provide a user interface on touchscreen (1) and/or keyboard (3) that may allow a user to interact with the system.

Computer (2) may present the user with a set of options. The user can perhaps select which interchangeable head (8) is installed on the system (54) or as part of milling machine (7). The user may then be presented with a screen that is preconfigured with the capabilities of that interchangeable head (8). The user can then control the system by entering a command into the touchscreen (1) or, alternatively, in keyboard (3). The computer (2) may then send the instructions to a controller, or perhaps controller driver (4), which may send electrical impulses to motor (5) located on the X, Y, Z, or additional axes as configured, which may move the work table (9) or other element, and the interchangeable head (8) via drive screws (10).

As but one example of a process element, the milling machine (8) may be a vertical milling machine, such as shown, but the control system could work just as well in a gantry configuration, or delta milling machine configuration, or otherwise. The characteristics in terms of the type of milling machine (8), drive controller (4), and motors (5) may be preconfigured as options within the computer (2) and can even be selected as an option by the user, such as via touchscreen (1) or keyboard (3). All this, and indeed the entire invention and all claims can be adapted to be available for additive manufacturing systems such as 3D printers as well as for removal based manufacturing systems. Some of the possible embodiments are more particularly described in the following examples that are intended as illustrations only, since numerous modifications and variations within the scope of the present disclosure will be apparent to those skilled in the art.

In another configuration, a surface map may be generated such as with a touchprobe. The surface map may be processed such as on a computer system and alterations may be made for several points to be drilled and tapped, A new toolpath may be generated and transferred to the control computer. The touchprobe may be removed from the interchangeable head mount and replaced by a water cooled spindle. The altered toolpath may be loaded via touchscreen and the user may select the new head and then execute the toolpath.

As can be understood from the foregoing, embodiments of the invention may include a formative process element (24). The formative process element (24) can be a material extrusion head or can be a photosolidification formative process element (25). For processes that are not additive, the formative process element (24) can be an element that removes material such as a cutting laser, a milling machine (7) component or the like. Embodiments of the invention may include a layup or other movement system (26) configured to effect positioning of a formative process element (24) relative to a fabrication support (21). The layup or other movement system (26) may respond to a movement control (27). Such a control (27) can serve, or cause the activity, in a variety of ways, including but not limited to as fabrication movement, through fabrication instructions, and even as a proactive movement control. Embodiments of the invention may include a fabrication input.

Embodiments can include one or more inputs (28) through which data, whether raw data of the shape of the item or even specified command or movement instructions can be provided. One of the inputs (28) may specifically be a movement input which is an input where movement information is provided. There can also be an input (28) for a broader variety of fabrication data, and there can be an input (28) for user entry. Thus, an input (28) can be a keypad (3) or even a touchscreen (1). An input (28) can also be a data reader and can be wireless or hardwired. It can even be provided through an internet connection or the like.

Embodiments of the invention may include computer or digital process capabilities. These may be programmable. In basic systems there can be an external computer (2) to control activities. Resident, perhaps even transparent capabilities can be provided. These capabilities can include a processor (29) perhaps such as an ASIC, a programmable processor, or even general purpose capabilities within the overall additive manufacturing system. Such a processor (29) can be configured in a variety of ways to achieve individual functions of the invention or can even be configured to serve as all such functions of the invention if desired to be available in combination or the like. In one configuration, the processor (29) can be configured as a movement transformation processor (30). This embodiment is indicated in FIG. 1. It can also serve to transform initial fabrication movement to refined fabrication movement. The initial fabrication movement can be indicated by instructions that direct a traditionally accomplished movement perhaps such as the mentioned traditional coarse, usually isolated stepper motor motions in an X and Y direction. This traditional movement can be transparently transformed into a more appropriate or more desired movement. As indicated in FIG. 1 as but one example, this transformation such as by movement transformation processor (30) can alter the initial step-wise movement (31) to a curved or more generally curvilinear movement (32). This transformed movement can be accomplished by programming contained within the movement transformation processor (30) that reviews the initially indicated movement and either allows it or determines that a better movement can or should be accomplished, and then alters the indications for movement to direct the system as appropriate to achieve the new, transformed movement. This can even be accomplished seamlessly such as by presenting the movement transformation processor (30) in the 3D printer or the like so that upon receiving the traditional movement instruction, the printer itself alters the movement and accomplishes it in a more desirable fashion.

In another embodiment, a processor (29) can be configured as a command transformation processor (33). This embodiment is indicated in FIG. 2. A command transformation processor (33) can also serve to transform aspects. It can even take in an initial command or sequence of commands and alter it or them to provide an improved command or sequence of commands. This can include altering commands, even if the movement is the same or similar. The command transformation processor (33) can accept or use fabrication instructions to yield refined fabrication instructions. For example, analogous to the movement transformation of FIG. 2, a diagonal movement such as traditionally indicated as a sequence of X-Y instructions such as left-back-left-back-left-back-left-back-left-back, etc. could be transformed by a command transformation processor (33) into a sequence of diagonal commands perhaps such as could be indicated through a "diagleft" nomenclature as: diagleft-diagleft-diagleft-diagleft-diagleft. In systems where the movement system (26) involves a set of motors (5) and drive screws (10) shown conceptually only in FIG. 2, these can even be controlled or operated simultaneously, perhaps a new capability for the system, to move in a non-orthogonal direction rather than only as a pure X or Y step movement. An example of how this can result in altered movement is shown conceptually in FIGS. 6A-6C and 7A-7C as discussed in more detail below.

In yet another embodiment, a processor (29) can be configured as a proactive control processor (35). This embodiment is indicated in FIG. 3. Similarly, a proactive control processor (35) can also serve to transform aspects. It can even proactively control movement of a formative process element (24) in response to as yet unexecuted item formative data. For example, if there is an upcoming movement around a curve, the proactive control processor (35) could read ahead, and determine that a more appropriate way to lead into the upcoming curve is to lead the turn in so that a more smooth curve is achieved, so that more appropriate layup of material is achieved, or the like. Data may be received by such a processor (29) from an input (28), as discussed above. Such data may simply be a broad indication of the desired final product, such as an image or it may be already calculated movement instructions or set command(s). It may even be a suggestive instruction. Regardless of the type of data that comes through the input, a processor can then transform that data into a refined version of that data. A proactive control processor (35) may create refined movement from virtually any type of data input. A command transformation processor (33) may create refined commands, whether from initial commands or from mere suggestive instructions. A movement transformation processor (30) may create refined movement, whether from initial movement or from mere suggestive instructions.

Any of the processing concepts discussed above may be accomplished by a standard computer processor with programming that a person of ordinary skill in the art could have established. These processing concepts may also be accomplished by a processor (29) that is specialized for the performance of a given task. A specialized processor may only create refined movement or may achieve any of the functions explained for this invention broadly. The specialized processor may also create transformed commands. It may also proactively control movement in response to as yet unexecuted item formative data. Such processors (29) may be formative system reserved. A formative system reserved processor could be configured to have no substantial other tasks so it can act in more a real time manner. It can even have limited capabilities only as are necessary for the 3D printer or the like to accept traditional input(s) and then alter those inputs to achieve one or more of the functions explained as part of this disclosure. It may be dedicated and even on-board the specific fabrication system or 3D printer. Such processors may be permanently formative system reserved in that they are not equivalent to an external, generally programmable PC or the like. They may also be temporarily formative system reserved in that they are isolated during the active functions in which their real time activity might create demands. Such a specialized processor may also be system integral in that it is provided as an external board or a part of hardware within an otherwise unitary printer or the like. To enhance their real time capabilities, any of the processors discussed may have limited input-output (I-O) overhead in that they are less likely to be interrupted by an external communication need. This functionality may allow such processors to spend the bulk of their time doing the important work of performing transformation computations, instead of porting information in and out. Given this capability, the processors being discussed may generate movement instructions that are substantially time efficient in that the instructions are faster of just less computationally demanding.

Any of the processors (29) in the various embodiments of this invention may be configured to serve as a dynamically interactive processor. They may act during otherwise suggested fabrication activity in a manner that is not perceived as interrupting traditional actions. They can also act in a constantly calculative or processing manner so that new received instructions are dynamically reacted to, to achieve the desired end result. They may perform any of the discussed transformation computations while the system is performing layup operations.

As one might understand from considering the proactive control processor (35) above, embodiments can also include a processor (29) configured to engage in predictively responsive transforming. This capability may allow the system to generate predictive movement instructions. A processor (29) may engage in look ahead analysis. It can look a set or variable number of lines ahead in instructions, and can even be limited to such as five, ten, fifteen, or so lines ahead to assess upcoming activity thus limiting processor demands and real time operations. Processors (29) may also generate transformant instructions. Such instructions may be transformant movement instructions. Any of the discussed processors may perform real-time interactive transforming. Such real-time activity can permit some calculative delay but such may be not significantly perceptible to a user or may still achieve the end result in a comparable time. Embodiments of the present invention can provide for operationally real-time interactive transforming, which allows transformation computations to be performed at a speed sufficient to avoid any significant slowdown in the manufacturing operation. Embodiments can also achieve the end result in a faster time, of course.

Embodiments of the invention may include a manufacturing system integral clock, which can mean a dedicated timekeeping device or even an onboard dedicated timekeeping device. This can allow accurate movement transformations, can allow monitoring or velocity based movements as mentioned below, or the like. Embodiments of the invention may include a processor configured to refine local movement of a formative process element relative to a fabrication support.

The processor (29) can also serve as, or there can be provided a separate, controller (36). This controller (36) can control movement of a movement system (26). It can be a drive controller (4). The controller (36) can be configured to serve as a transformed movement controller (37) or, as mentioned below, as a multiple process element action controller (38). For embodiments of the invention that include a transformed movement controller (37), such a controller (36) can control movement after data, instructions, or movements have been transformed. There can even be multiple sets of transformations. As shown conceptually in FIG. 1, embodiments of the invention can include a fabrication data transformative recalculator (39) that merely recalculates data to present it in a manner that is more desired for differing movement, for differing hardware, or otherwise. It can even have a limited list of instructions that are automatically recalculated upon being indicated. A fabrication data transformative recalculator (39) can remain responsive to initial fabrication instructions even though it achieves or directs transformed or more generally recalculated instructions or movement.

As can be understood from the above discussion of the various embodiments, the invention may include altered movement instructions. Such altered movement instructions may be directed by the controller (36). Altered movement instructions may be different from initial movement instructions. Altered movement instructions may also be optimized movement instructions. Optimized movement can be of a formative process element (24) or even of a fabrication support (21). In this regard, as those skilled in the art well understand and as shown in FIG. 5, in many stereolithographic fabrication systems, the fabrication support (21) can be moved to allow formation of the next fabrication layer. In embodiments, this support movement system can be a variant item layer reposition system (40). This can be controlled through position variant movement instructions that can vary the repositioning or movement as appropriate to an item being formed. This is discussed in more detail below. However, optimized movement instructions may be with respect to any of the above. They may be speed optimized movement instructions so that the overall fabrication time is reduced from a traditional instruction indicated overall fabrication process. They may also be smoothed layup surface movement instructions that achieve a more smooth, less stepped end result for the fabrication item (22). Altered movement instructions may be trajectory planned movement instructions so that they evaluate the upcoming movement indicated, assess them from the trajectory of the movement item or system, and plan a more appropriate, likely improved, trajectory for that element. As mentioned above, the altered movement instructions can also be curvilinear movement instructions.

Optimized movement instructions may be velocity optimized movement instructions. By evaluating and/or creating improvement movements, embodiments can analyze or achieve movement that is velocity based, rather than just more simplistic orthogonal step movement based. Velocity based movement can be velocity optimized movement instructions. One such optimization can be to create constant tangential velocity such as along a curve when forming an item. Velocity can be considered at edges and sharp turns to more appropriately form the item, more appropriately move the process element (24) or the like. This can be implemented to avoid undesired build-ups or other effects in the formative material. More generally, altered movement instructions may be velocity configured movement instructions.

Altered movement instructions may be approximate movement instructions. The new movements might not be precisely what was initially indicated. Of course, the initially indicated movements themselves might not be what was truly desired but due to traditional constraints such were often was perceived being the only available, and thus required, movement(s). Altered movement instructions may also be positionally variant movement instructions in that they vary the position initially indicated. This variation can be within a set tolerance, such as can be understood from FIGS. 6A-6C and 7A-7C by comparing the smoothed movement (60) with the more traditional step-wise movement (59). With a set deviation tolerance (55), the altered movement instructions may also be considered to present deviation tolerance movement instructions. Deviation tolerance movement instructions may have a tolerance within which movement not originally directed is nonetheless tolerated. As can be understood, all of the discussed movement instructions may be generated by a processor (29), an external computer (2), or in other ways.

Embodiments of the invention may also include a failsafe activity monitor (41) as indicated in FIG. 3. The failsafe activity monitor (41) may be a temporal activity monitor (42). There may be a pulse train signal (57) and a pulse train signal sensor (58) such as contained in an independent system, in hardware, in an ASIC, through an independent processor, or the like. This type of system can have the operative processor send out a regular pulse (such as at a set frequency). This pulse may be sensed independently in a manner that if the pulse is not indicated or sensed, the independent element can act to reset or otherwise act to avoid what may be an apparent failure in the operative processor or the like. The general failsafe activity monitor (41) may be configured as an intelligent platform management interface specification system that meets the IPMI standards or it may be a more simplistic system. Embodiments of the invention that include a failsafe activity monitor (41) may also include a localized self-reliant disable (56). Such embodiments can be localized within the 3D printer or the like and can be self reliant in that they are not significantly affected by a lock up of an operation element and so can act to disable elements of the printer or such. Elements that can be disabled can include the movement system, heaters, materials feeds, or other aspects that can be a problem. A localized self-reliant disable may be a movement shutoff. It may also be a heater shutoff. It may also be a support shutoff. It may also be a source shutoff.

Figure 8:
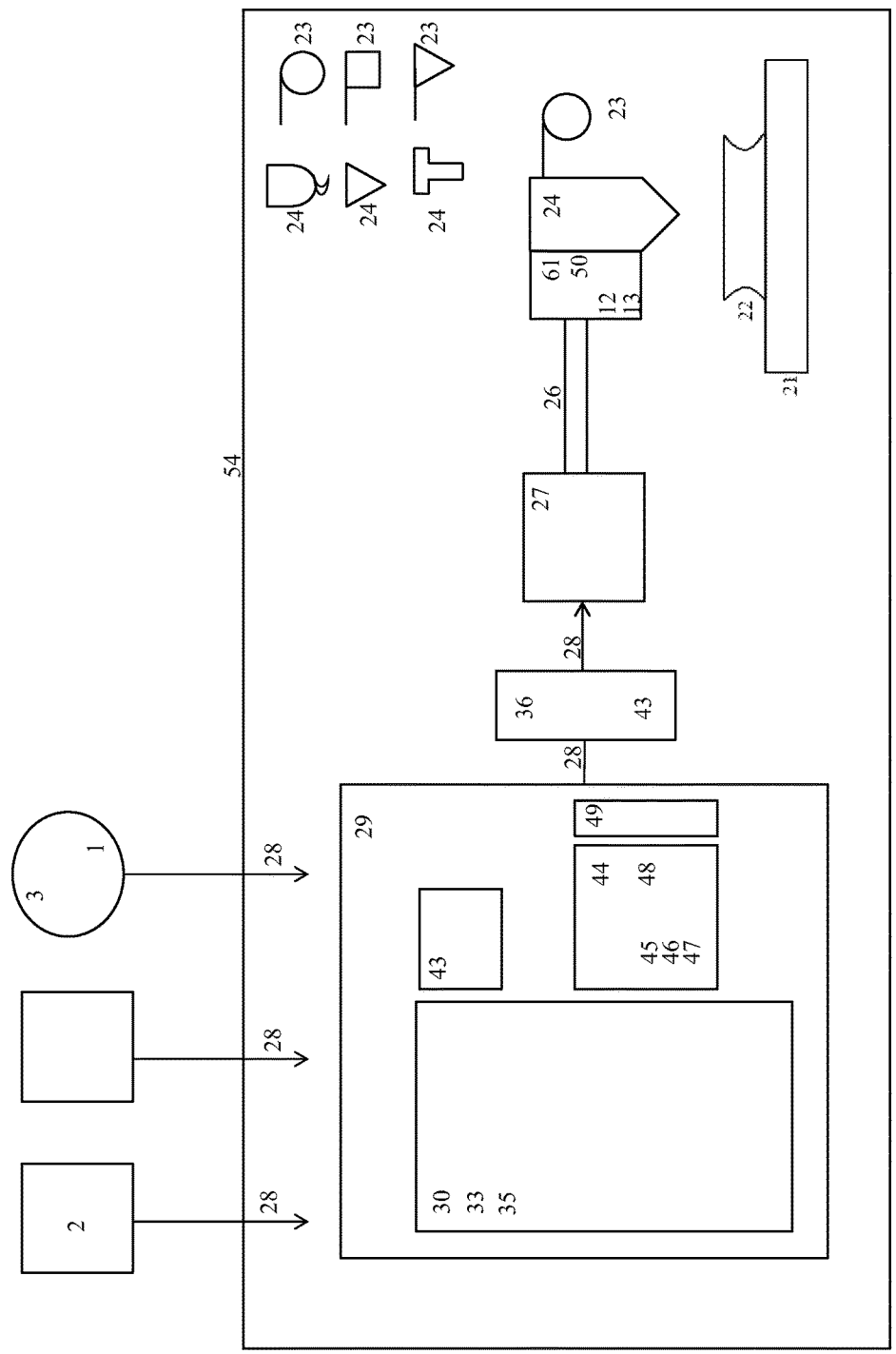
FIG. 8 shows a conceptual block diagram of an embodiment of the invention that includes a formative process element change capability.
Figure 9:
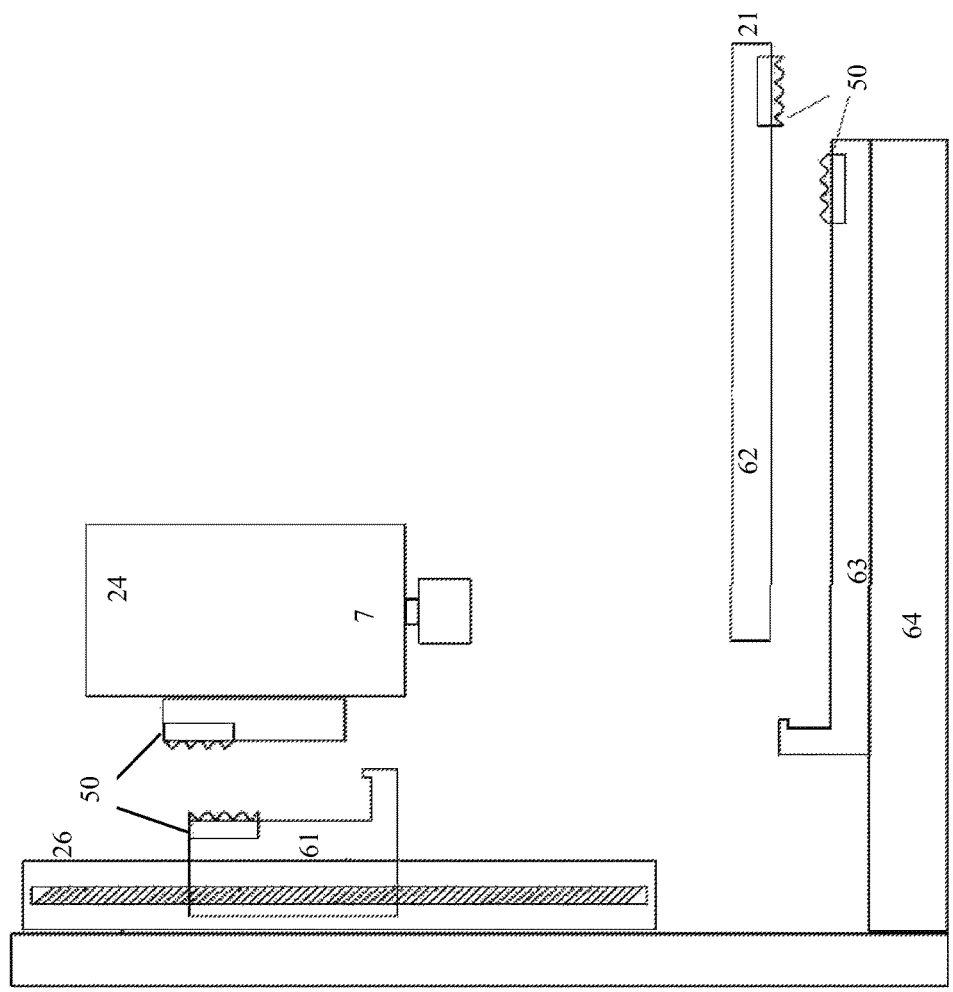
FIG. 9 shows a conceptual block diagram of an embodiment of the invention that includes a detailed formative process element change capability.
Figure 10:
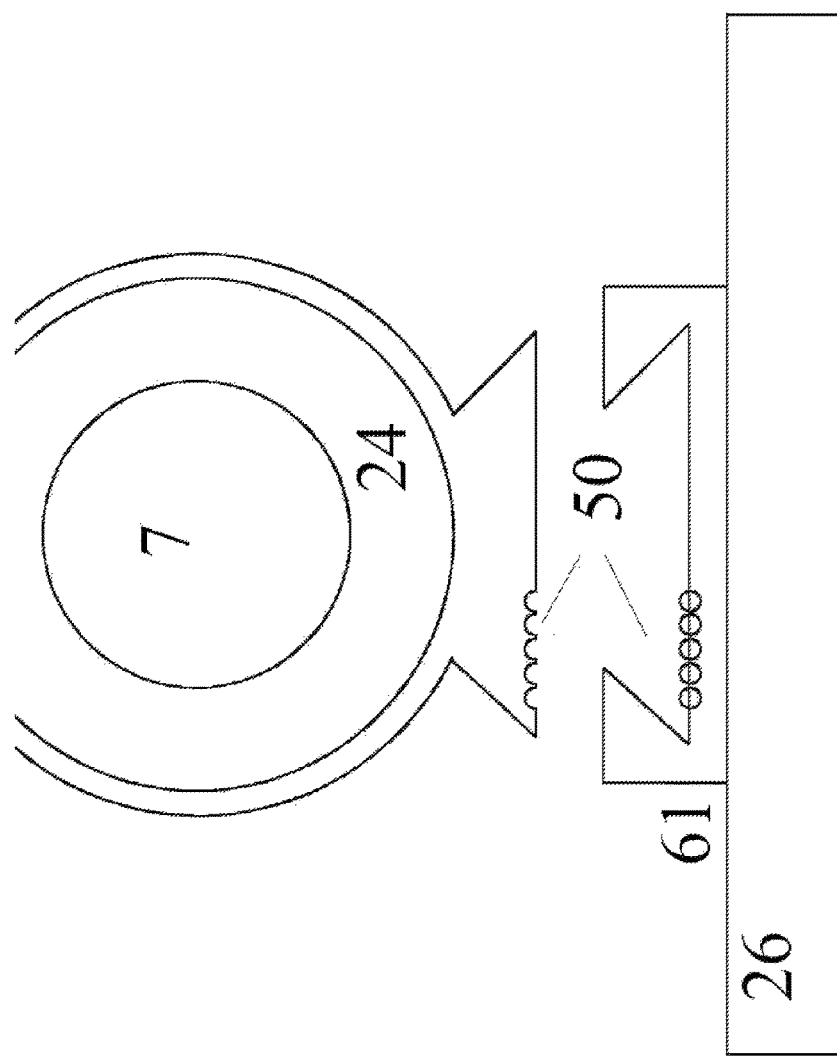
FIG. 10 shows a conceptual block diagram of an embodiment of the invention that includes a detailed formative process capability with a top-down view.

As mentioned above, another aspect of an embodiment of the invention is the ability to present a system that can be a multiformative manufacturing system as indicated in FIG. 8. Multiple formation effects, such as through multiple and differing process elements (24) can be seamlessly or merely automatically provided or made available in one system, one printer, one fabrication system, or the like. As can be appreciated, embodiments of the invention can include a first function formative process element (24). As discussed above, such a first function might be a type of additive manufacturing perhaps such as a 3D print head. Such an embodiment can also include a differing formative process element (24) that may even be a type of material removal element. Embodiments of the invention may include a process element movement system as a movement system (26) that can accommodate either type of formative process element (24). Such a system may be configured to effect positioning of a first function formative process element (24) relative to the fabrication support (21). Similarly, such embodiments of the invention may include a formative process control (43) that also can accommodate either type of formative process element (24). The formative process control (43) can be a type of controller (36) that may direct item formative processes. The process element type of movement system (26) may be responsive to such a control (43). Embodiments of the invention may include a second function formative process element (24). Such a second function could be a type of additive manufacturing. It could also be a type of material removal. Importantly, embodiments of the invention may go well beyond first and second function process elements (24) numerous options can be provided. Embodiments of the invention may include any of a plurality of formative process capabilities, which may be subject to movement systems (26) and controls (36 or 43) as discussed above. These can even mount to a common mount (61), perhaps such as with a standardized mounting plate (13) or standardized mounting block (12). Further, as can be appreciated from FIGS. 9 and 10, sensors (50) perhaps as part of or with mounting pins as shown. In addition, as shown in FIG. 9, differing formative process element (24) can also include differing fabrication supports (21). The fabrication support (21) can include a fixture (62) and a fixture mount (63) which themselves can have a sensor (50) to permit determinations as explained below. All can be established on a base (64) as shown.

In some embodiments, the system may be configured to accept or even sense components, heads, or fixture identifiers such as model codes, drop down selections, or even individualized identifiers perhaps such as RFID transmissions or the like to assure proper component charges. Embodiments can also include conformational or test routines to confirm selected items are indeed indicated correctly, licensed correctly, or even installed correctly. Further, embodiments can also include historical or indicative parameter check, even prior to operation commands to assure proper integrity. Storage of previous activities or even other user's or component information can be incorporated for pre-operation or test operation checking. Embodiments can use the above information to even accomplish scaling or control parameter adjustment for individual installations, selections, or positioning automatically in generation specific user or user control files or the like. Such can even change the user interfaces for ease of use or focusing of parameters. Warnings can be automated to prevent execution when necessary, or to prompt operator action as needed.

The differing formative process elements (24) may be universally held by a mounting block (12). In one type of movement system (26), the mounting block (12) may be controlled by an axis screw (10), as shown to a limited extent conceptually in FIG. 2, which may provide motive force directing the mounting block (12), such as upwards to downwards or otherwise, perhaps based upon the direction that the drive screw (10) is rotated by motor (5). Guide rods (11) may be included such as to provide stability and guidance to mounting block (12). The mounting plate (13) may be mounted to the mounting block (12) perhaps via attachment points (14). The mounting plate (13) may be a slotted block that may even mate with dovetail plate (16). A shim (not shown) can be included and adjusted perhaps via adjustment screws (15) clamping the differing formative process elements (24) such as the interchangeable head (8) to the mounting plate (13). A clamping system (17) can even be included to allow more universal mounting of even other heads.

In accomplishing changes to the differing formative process elements (24), embodiments of the invention may allow for substantially uninterrupted changing of elements and the like. In this manner the usually significant interruptions for manual, mechanical reconfiguration, driver loading, system recalibration, processor reset or reload, and/or other delaying activities can be significantly avoided. In such configurations, embodiments can include a substantially uninterruptive process element changer (44) as shown in FIG. 8. Such a substantially uninterruptive process element changer (44) may allow for change between a first function formative process element (24) and a second function formative process element (24) or between differing additive material sources (23). It may function as process element removal and replacement system or may achieve capability switches without removal. More generally, the substantially uninterruptive process element changer (44) may facilitate changing between any of a plurality of formative process capabilities. As discussed above with respect to real time activity, substantially uninterruptive process element or process capability changing can permit some activity time, but such is not substantially perceptible to a user or may still achieve the end result in a comparable time. They can avoid any significant slowdown in the manufacturing operation. For example, such a substantially uninterruptive process element changer (44) may be a substantially only mechanical change activity interrupt system. A substantially only mechanical change activity interrupt system may not slow down processing activity for any reason other than the mechanical activity required to perform a formative process capability change. Calculations and loads and the like can be achieved during movement to pick up the other head or can be deferred or split up to other available processor time slots. Importantly, such a system may not require any sort of software reset or user data reentry, which may serve to substantially reduce operational interruptions. Such entries can even be achieved automatically with outside or external internet access, database access, or the like. Changes can also be automatically or more simply achieved to other material sources (23) as well as shown.

Embodiments of the invention directed toward changing formative process capabilities may include a processor that can be configured as a change precalculator processor (45). The processor (29) can act to precalculate actions, values, prepare to load drivers, or even create drivers or transformations in advance of them being actually needed so that less interruption exists for a change or transformation or the like. Transformed movements can be established in advance so that one driver can be adapted for differing formative process capabilities such as by aliasing and the like. A coordinate transformation can be achieved by aliasing a different signal so that one driver can be used for different heads. The processor (29) may be a coordinate alias processor (46). A coordinate alias processor (46) may utilize or create alias values, which may cause a movement system to operate as though it were traveling to a first set of coordinates but to actually travel to a second, desired set of coordinates. By establishing elements in advance or prior to being called for, the processor (29) can serve as an advance driver transformation processor. An advance driver transformation processor may perform any needed driver transformations in advance of actually executing fabrication steps, such as with a new formative process capability. Such an advance driver transformation processor may be an interchange movement driver transformation processor that achieves its values during interchange movement without substantial other delays in the system. Any of the processor capabilities discussed in connection with changing between formative process capabilities (24) may be accomplished by a standard computer processor or by a specialized process element change capability processor as mentioned above. Similarly, they may also be accomplished by a formative system reserved change capability processor or as a permanently formative system reserved component. It may also be temporarily formative system reserved and may also be a dedicated processor as well. A manufacturing system integral process element change capability processor is also available which as before may be an onboard processor.

An aspect that may be appreciated from the overall goals is that embodiments of the invention may include an operationally transparent process element changer (47) that may appear as operationally transparent in terms of time taken or interruption caused. Such an operationally transparent process element changer (47) may operationally alter between any of a plurality of formative process capabilities, as discussed above. Such an operationally transparent process element changer (47) may be an interprocess process element changer that achieves its functions in between processes without noticeable delays. An interprocess process element changer can be capable of switching between formative process capabilities while operations are ongoing. Switching can thereby be achieved in an operationally transparent fashion.

Where embodiments of the invention include a plurality of formative process capabilities, they may also include a controller (36) configured as a multiple process element action controller. Such a controller (36) may be capable of seemingly controlling the action of multiple process elements by itself, with no need to change between controllers or otherwise load capabilities. An operationally transparent process element changer may be a no-reset process element changer (48) in that no reset or apparent reconfiguration is needed. A no-reset process element changer (48) may be a substantial time saver relative to prior manufacturing systems. It may not reset aspects of the manufacturing system, and may not reload files. A no-reset process element changer (48) may be a no-reset differential process element changer that does not need a reset when changing between differential process elements, such as those from different manufacturers, or those achieving different processes. A no-reset differential process element changer may change between differential process elements without reset, as discussed above.

Embodiments of the invention directed to operationally transparent process element changes may include a processor (36) configured as an interruption minimization processor. An interruption minimization processor may reduce interruptions even if not to the absolute minimum. It may also substantially eliminate interruptions. It may accomplish this through the use of efficient code and through avoidance of unnecessary overhead activity or otherwise. An interruption minimization processor may be an automatic interruption minimization processor that does all this seamlessly to a user. It may also be a common driver processor such as having two different process capabilities use the same driver. The common driver processor may use a common driver to drive two or more formative process capabilities during fabrication operations. An interruption minimization processor may be a common coordinate processor that may use common coordinates for two or more formative process capabilities, even where such capabilities traditionally require their own coordinates. A common coordinate processor may also be a coordinate transformation processor and a coordinate alias processor (46) as mentioned above.

Embodiments of the invention directed toward switching between formative process capabilities may allow the processor (29) to be configured as a process element change accommodative processor that can accommodate such changes. The process element change accommodative processor may be a universal process element control processor that can work for several different formative process capabilities. It may also work for all desired formative process capabilities reasonably likely to be used. Such a processor may also serve to act as a movement transformative processor, like those discussed above. Desired formative process capabilities may be very similar to each other, with only minor variations in function. They may also be significantly dissimilar function formative process capabilities. Dissimilar function formative process capabilities may be dissimilar manufacturer heads. Dissimilar manufacturer heads may be heads manufactured by two or more different companies. Dissimilar function formative process capabilities may be dissimilar function material removal capabilities. They may also be dissimilar additive manufacturing capabilities. They may also be a combination of one of more material removal capabilities and one or more additive manufacturing capabilities.

Further embodiments of the invention may include a processor (29) that can be configured to serve as a peripheral component assurance processor (49). This type of embodiment is indicated in FIGS. 5 and 8. A peripheral component assurance processor (49) can assess the needed peripheral components and either through user entry indications of by a separate component sensor or sensors (50), confirm that needed components are installed or are correctly configured. If any component is missing or merely returns other than the desired codes, the peripheral component assurance processor (49) may serve as part of a peripheral component warning system to warn the user of a need to install or otherwise adjust the system. It may also indicate whether a peripheral component is working properly at a given time. Embodiments of such an embodiment of the invention may include an input, as discussed above whereby a user or external system or computer (2) can provide an input indicative of one or more peripheral components and thus provide an input (28) configured as a peripheral components data input. A peripheral component data input that is user provided may allow a user to input data regarding peripheral components in use at a given time. A peripheral component assurance processor may even act to obtain needed components. For example, the peripheral component assurance processor can be programmed as an automatic peripheral component driver capture system that may search a database, including but not limited to the internet, for a needed a peripheral component driver. Such a system can then convert the driver into the format or formats needed for use in a given manufacturing process.

As shown in FIG. 5, processor (29) can also act to check the amount of consumable present to assure adequate amounts of resin or the like are available for the planned formation process or fabrication item (22). As such the processor (29) can be configured as an adequate consumable assurance processor. Similarly, embodiments of the invention may include a formative process information display. A formative process information display may display any of a great variety of fabrications item (22) or fabrication process variables. It may display item volume. It may also display an estimated source material amount. It may also display an actual source material amount. It may also display an estimated build time and even the saving from a traditional build time through use of the optimization transformations and processes mentioned above. It may also display an actual build time. It may also display item weight.

In keeping with the above explanation of the look ahead aspects, embodiments of the invention may more generally be considered as including an antecedent activity, postliminary formative control processor (51) as shown in FIG. 5.

The processor (29) can be configured to assess what has been fabricated and adjust one or more of its upcoming activities accordingly. An antecedent activity, postliminary formative control processor (51) may be evaluatively responsive to prior item formative processes or activities. Again, this type of processor configuration can be achieved by a processor (29) that is a standard processor, a specialized antecedent activity, postliminary formative control processor, formative system reserved antecedent activity, postliminary formative control processor, and the like. It can be temporarily formative system reserved, permanently formative system reserved, dedicated, manufacturing system integral, or onboard as mentioned above.

As an example, an evaluatively responsive processor may variantly reposition one or more layers of a fabrication item based on antecedent activity. It may then be considered as postliminary formative control processing to optimize the result. It may assess the fragility or structural character of what has already been formed and may vary the repositioning of the partially formed fabrication item (22) or the fabrication support (21) or the resin container (50) to both avoid damage to an existing item and allow faster repositioning. In existing systems the repositioning is typically done at a constant speed or in a constant interval. This usually needs to be set considering the weakest the item might be. In embodiments with a variant item layer reposition system (40), the repositioning action can be sped up if higher structural integrity is available. Thus, a variant item layer reposition system (40) may also be formation speed optimized. This can be particularly significant for embodiments of the invention that include a photosolidification process element (25). As is known, the photosolidification process element (25) may be a bottom up photosolidification process element or a top down type of element. In systems with a bottom up photosolidification process element, fabrication items can be formed on the bottom, one layer at a time. A variable amount of source material may be transported to a fabrication item support. The source material may then be exposed, from the bottom, to UV light or other actions to solidify. The item layer formed in this process may then be variantly repositioned based on a multitude of possible variables. As examples, a variant item layer reposition system may be an item structure variant item layer reposition system. A variant item layer reposition system may also be responsive to previous fabrication structural characteristics of an item being fabricated. A variant item layer reposition system may also be responsive to item layer surface area and resin or source material viscosity. It can even test, sense viscosity, sense temperature, or have entered the material type to understand the possible viscosity. Embodiments of the invention where item layers are variantly repositioned may include a source material viscosity sensor (52). A source material viscosity sensor (52) may be operated by the processor (29). Embodiments of the invention that include a variant item layer reposition system may include a fabrication data input, as discussed above. In addition to the inputs discussed above and other possible inputs not specifically discussed herein, a fabrication data input can be a user fabrication information input. Such embodiments can have the variant item layer reposition system (40) serve as a viscosity variant item layer reposition system. It may also be a fluid physical resistance responsive item layer reposition system. It may assess the area of last formation and may present an item layer area responsive item layer reposition system. Embodiments can have a fluid viscosity responsive item layer reposition system, an item mechanical support responsive item layer reposition system, an item structural integrity responsive item layer reposition system, and a source material variant item layer reposition system. Importantly, it could be responsive to a much wider variety of variables than those presented above—they are merely representative examples.

Embodiments of the invention that include an input (28) configured as a user fabrication information input may include a user multiple source material reconfigurable multisource processor that responds to such an input. These inputs can even be done by simple drop down menus or such through use of a touchscreen (1). Embodiments that include this feature may, of course, be responsive to the user information input. Embodiments that include multiple source material reconfiguration may also include processor (29) configured as an automatic source material reconfiguration processor. As with the processors (29) discussed above, such a processor may be a standard processor, a specialized processor, a formative system reserved processor, and the like. It can be temporarily formative system reserved, permanently formative system reserved, dedicated, manufacturing system integral, or onboard as mentioned above.

A variety of possible applications for a processor have been discussed. These and other applications may be accomplished by a coded computer processors configured to achieve the desired process. Such processors (29) may transform data representative of physical movements informative of product formation. Desired fabrication can be achieved with particularized computer hardware configured to transform fabrication of the item. It can also be accomplished with a processor configured to move source material in a different manner than that specified in initial movement instructions. Fabrication can also be achieved with a computer-readable storage medium containing computer-readable program instructions for movement transformation.

Again, different features were discussed for various dynamic manufacturing systems. The features of each of the dynamic manufacturing systems are not to be considered as only possible in one dynamic manufacturing system, but should be considered as useful for all of the presented dynamic manufacturing systems in any combination or alone. Any of the capability combinations or permutations in the multiformative systems and otherwise are examples and could change within the present invention. While the invention has been described in connection with a preferred embodiment, it is not intended to limit the scope of the invention to the particular form set forth, but on the contrary, it is intended to cover such alternatives, modifications, and equivalents as may be included within the spirit and scope of the invention.

Examples of alternative claims and clauses to be considered as part of this invention disclosure and available for eventual assertion as claims include:

1. A dynamic additive manufacturing system from which a fabrication item can be formed comprising:
a fabrication support upon which an item can be formed;
an additive material source;
a formative process element;
a layup movement system configured to effect positioning of said formative process element relative to said fabrication support;
a movement control to which said layup movement system is responsive;
a fabrication movement input from which fabrication movement information is provided; and
a movement transformation processor transformatively responsive to said fabrication movement input.

2. A dynamic additive manufacturing system as in clause 1, or any other clause, wherein said movement transformation processor transformatively responsive to said fabrication movement input comprises a command transformation processor transformationally responsive to fabrication instructions.

3. A dynamic additive manufacturing system as in clause 2, or any other clause, wherein said command transformation processor transformationally responsive to fabrication instructions comprises a proactive control processor evaluatively responsive to as yet unaccomplished item formative data.

4. A dynamic additive manufacturing system as in clause 1, or any other clause, wherein said movement transformation processor transformatively responsive to said fabrication movement input comprises a transformant instruction generator.

5. A dynamic additive manufacturing system as in clause 1, or any other clause, wherein said fabrication movement input from which fabrication movement information is provided comprises initial movement instructions and wherein said movement transformation processor transformatively responsive to said fabrication movement input comprises altered movement instructions to control said movement system.

6. A dynamic additive manufacturing system as in clause 5, or any other clause, wherein said altered movement instructions to control said movement system comprise approximate movement instructions.

7. A dynamic additive manufacturing system as in clause 6, or any other clause, wherein said approximate movement instructions comprise positionally variant movement instructions.

8. A dynamic additive manufacturing system as in clause 7, or any other clause, wherein said approximate movement instructions comprise deviation tolerance movement instructions.

9. A dynamic additive manufacturing system as in clause 5, or any other clause, wherein said altered movement instructions to control said movement system comprise velocity configured movement instructions.

10. A dynamic additive manufacturing system as in any of clauses 5, 6, or 8, or any other clause, wherein said altered movement instructions to control said movement system comprise curvilinear movement instructions.

11. A dynamic additive manufacturing system as in clause 5, or any other clause, wherein said altered movement instructions to control said movement system comprise velocity configured movement instructions.

12. A dynamic additive manufacturing system as in clause 4, or any other clause, wherein said transformant instruction generator comprises a trajectory planned instruction generator.

13. A dynamic additive manufacturing system as in clause 12, or any other clause, wherein said trajectory planned instruction generator comprises a curvilinear movement instruction generator.

14. A dynamic additive manufacturing system as in clause 4, or any other clause, wherein said transformant instruction generator comprises a velocity optimized movement generator.

15. A dynamic additive manufacturing system as in clause 14, or any other clause, wherein said velocity optimized movement generator comprises a constant tangential velocity generator.

16. A dynamic additive manufacturing system as in clause 1, or any other clause, wherein said movement transformation processor transformatively responsive to said fabrication movement input comprises a specialized layup movement transformation processor.

17. A dynamic additive manufacturing system as in clause 16, or any other clause, wherein said specialized layup movement transformation processor comprises a formative system reserved layup movement transformation processor.

18. A dynamic additive manufacturing system as in clause 17, or any other clause, wherein said formative system reserved layup movement transformation processor comprises a manufacturing system integral layup movement transformation processor.

19. A dynamic additive manufacturing system as in clause 18, or any other clause, wherein said manufacturing system integral layup movement transformation processor comprises a processing system limited input-output overhead processor.

20. A dynamic additive manufacturing system as in clause 18, or any other clause, wherein said manufacturing system integral layup movement transformation processor comprises a substantially time efficient movement instruction generator.

21. A dynamic additive manufacturing system as in clause 1, or any other clause, wherein said movement transformation processor transformatively responsive to said fabrication movement input comprises a coded computer processor configured as a movement transformation processor transformatively responsive to said fabrication movement input.

22. A dynamic additive manufacturing system as in clause 1, or any other clause, wherein said processor transforms data representative of physical movements informative of product formation.

23. A dynamic additive manufacturing system as in clause 1, or any other clause, wherein said processor transforms physical movement of product formation.

24. A dynamic additive manufacturing system as in clause 1, or any other clause, wherein said processor comprises particularized computer hardware configured to transform fabrication of the item.

25. A dynamic additive manufacturing system as in clause 1, or any other clause, wherein said processor is configured to move source material in a different manner than that specified in initial movement instructions.

26. A dynamic additive manufacturing system as in clause 1, or any other clause, wherein said processor comprises a computer-readable storage medium containing computer-readable program instructions for movement transformation.

27. A dynamic additive manufacturing system from which a fabrication item can be formed comprising:
a fabrication support upon which an item can be formed;
an additive material source;
a formative process element;
a layup movement system configured to effect positioning of said formative process element relative to said fabrication support;
a movement control to which said layup movement system is responsive;
a fabrication data input from which fabrication instructions are determined; and
a command transformation processor transformationally responsive to said fabrication instructions.

28. A dynamic additive manufacturing system as in clause 27, or any other clause, wherein said command transformation processor transformationally responsive to fabrication instructions comprises a movement transformation processor transformatively responsive to said fabrication movement input.

29. A dynamic additive manufacturing system as in clause 28, or any other clause, wherein said movement transformation processor transformatively responsive to said fabrication movement input comprises a proactive control processor evaluatively responsive to as yet unaccomplished item formative data.
30. A dynamic additive manufacturing system as in clause 27, or any other clause, wherein said command transformation processor transformationally responsive to said fabrication instructions comprises a transformant instruction generator.
31. A dynamic additive manufacturing system as in clause 27, or any other clause, wherein said fabrication data input from which fabrication instructions are determined comprises initial movement instructions & wherein said command transformation processor transformationally responsive to said fabrication instructions comprises altered movement instructions to control said movement system.
32. A dynamic additive manufacturing system as in clause 31, or any other clause, wherein said altered movement instructions to control said movement system comprises approximate movement instructions.
33. A dynamic additive manufacturing system as in clause 32, or any other clause, wherein said approximate movement instructions comprise positionally variant movement instructions.
34. A dynamic additive manufacturing system as in clause 33, or any other clause, wherein said approximate movement instructions comprise deviation tolerance movement instructions.
35. A dynamic additive manufacturing system as in clause 31, or any other clause, wherein said altered movement instructions to control said movement system comprise velocity configured movement instructions.
36. A dynamic additive manufacturing system as in any of clauses 31, 32, or 34, or any other clause, wherein said altered movement instructions to control said movement system comprise curvilinear movement instructions.
37. A dynamic additive manufacturing system as in clause 31, or any other clause, wherein said altered movement instructions to control said movement system comprise velocity configured movement instructions.
38. A dynamic additive manufacturing system as in clause 30, or any other clause, wherein said transformant instruction generator comprises a trajectory planned instruction generator.
39. A dynamic additive manufacturing system as in clause 38, or any other clause, wherein said trajectory planned instruction generator comprises a curvilinear movement instruction generator.
40. A dynamic additive manufacturing system as in clause 30, or any other clause, wherein said transformant instruction generator comprises a velocity optimized movement generator.
41. A dynamic additive manufacturing system as in clause 40, or any other clause, wherein said velocity optimized movement generator comprises a constant tangential velocity generator.
42. A dynamic additive manufacturing system as in clause 27, or any other clause, wherein said command transformation processor transformationally responsive to said fabrication instructions comprises a specialized command transformation processor.
43. A dynamic additive manufacturing system as in clause 42, or any other clause, wherein said specialized command transformation processor comprises a formative system reserved command transformation processor.
44. A dynamic additive manufacturing system as in clause 43, or any other clause, wherein said formative system reserved command transformation processor comprises a manufacturing system integral command transformation processor.
45. A dynamic additive manufacturing system as in clause 44, or any other clause, wherein said manufacturing system integral command transformation processor comprises a processing system limited input-output overhead processor.
46. A dynamic additive manufacturing system as in clause 44, or any other clause, wherein said manufacturing system integral command transformation processor comprises a substantially time efficient movement instruction generator.
47. A dynamic additive manufacturing system as in clause 27, or any other clause, wherein said command transformation processor transformationally responsive to said fabrication instructions comprises a coded computer processor configured as a command transformation processor.
48. A dynamic additive manufacturing system as in clause 27, or any other clause, wherein said processor transforms data representative of physical movements informative of product formation.
49. A dynamic additive manufacturing system as in clause 27, or any other clause, wherein said processor transforms physical movement of product formation.
50. A dynamic additive manufacturing system as in clause 27, or any other clause, wherein said processor comprises particularized computer hardware configured to transform fabrication of the item.
51. A dynamic additive manufacturing system as in clause 27, or any other clause, wherein said processor is configured to move source material in a different manner than that specified in initial movement instructions.
52. A dynamic additive manufacturing system as in clause 27, or any other clause, wherein said processor comprises a computer-readable storage medium containing computer-readable program instructions for command transformation.
53. A dynamic additive manufacturing system from which a fabrication item can be formed comprising:
a fabrication support upon which an item can be formed;
an additive material source;
a formative process element;
a layup movement system configured to effect positioning of said formative process element relative to said fabrication support;
a formative process control that directs item formative processes and to which said layup movement system is responsive;
a fabrication data input from which fabrication data is provided; and
a proactive control processor evaluatively responsive to as yet unaccomplished item formative data.
54. A dynamic additive manufacturing system as in clause 53, or any other clause, wherein said proactive control processor evaluatively responsive to as yet unaccomplished item formative data comprises a movement transformation processor transformatively responsive to said fabrication movement input.
55. A dynamic additive manufacturing system as in clause 54, or any other clause, wherein said movement transformation processor transformatively responsive to said fabrication movement input comprises a command transformation processor transformationally responsive to fabrication instructions.
56. A dynamic additive manufacturing system as in clause 53, or any other clause, wherein said proactive control processor evaluatively responsive to as yet unaccomplished item formative data comprises a dynamically interactive processor.

57. A dynamic additive manufacturing system as in clause 53, or any other clause, wherein said proactive control processor evaluatively responsive to as yet unaccomplished item formative data comprises a predictively responsive processor.

58. A dynamic additive manufacturing system as in clause 53, or any other clause, wherein said fabrication data input from which fabrication data is provided comprises initial movement instructions & wherein said proactive control processor evaluatively responsive to as yet unaccomplished item formative data comprises trajectory planned movement instructions.

59. A dynamic additive manufacturing system as in clause 57, or any other clause, wherein said predictively responsive processor comprises predictive movement instructions.

60. A dynamic additive manufacturing system as in clause 59, or any other clause, wherein said predictively responsive processor comprises a look ahead analytic.

61. A dynamic additive manufacturing system as in clause 60, or any other clause, wherein said look ahead analytic comprises a transformant instruction generator.

62. A dynamic additive manufacturing system as in clause 61, or any other clause, wherein said look ahead analytic further comprises velocity configured movement instructions.

63. A dynamic additive manufacturing system as in clause 61, or any other clause, wherein said look ahead analytic further comprises positionally variant movement instructions.

64. A dynamic additive manufacturing system as in clause 53, or any other clause, wherein said fabrication data input from which fabrication data is provided comprises initial movement instructions & wherein said proactive control processor evaluatively responsive to as yet unaccomplished item formative data comprises altered movement instructions to control said movement system.

65. A dynamic additive manufacturing system as in clause 64, or any other clause, wherein said altered movement instructions to control said movement system comprise approximate movement instructions.

66. A dynamic additive manufacturing system as in clause 65, or any other clause, wherein said approximate movement instructions comprise positionally variant movement instructions.

67. A dynamic additive manufacturing system as in clause 66, or any other clause, wherein said approximate movement instructions comprise deviation tolerance movement instructions.

68. A dynamic additive manufacturing system as in clause 64, or any other clause, wherein said altered movement instructions to control said movement system comprise velocity configured movement instructions.

69. A dynamic additive manufacturing system as in any of clauses 64, 65, or 67, or any other clause, wherein said altered movement instructions to control said movement system comprise curvilinear movement instructions.

70. A dynamic additive manufacturing system as in clause 64, or any other clause, wherein said altered movement instructions to control said movement system comprise velocity configured movement instructions.

71. A dynamic additive manufacturing system as in clause 61, or any other clause, wherein said transformant instruction generator comprises a trajectory planned instruction generator.

72. A dynamic additive manufacturing system as in clause 71, or any other clause, wherein said trajectory planned instruction generator comprises a curvilinear movement instruction generator.

73. A dynamic additive manufacturing system as in clause 62, or any other clause, wherein said velocity configured movement instructions comprise a velocity optimized movement generator.

74. A dynamic additive manufacturing system as in clause 73, or any other clause, wherein said velocity optimized movement generator comprises a constant tangential velocity generator.

75. A dynamic additive manufacturing system as in clause 53, or any other clause, wherein said proactive control processor evaluatively responsive to as yet unaccomplished item formative data comprises a specialized proactive control processor.

76. A dynamic additive manufacturing system as in clause 75, or any other clause, wherein said specialized proactive control processor comprises a formative system reserved proactive control processor.

77. A dynamic additive manufacturing system as in clause 76, or any other clause, wherein said formative system reserved proactive control processor comprises a manufacturing system integral proactive control processor.

78. A dynamic additive manufacturing system as in clause 77, or any other clause, wherein said manufacturing system integral proactive control processor comprises a processing system limited input-output overhead processor.

79. A dynamic additive manufacturing system as in clause 77, or any other clause, wherein said manufacturing system integral proactive control processor comprises a substantially time efficient movement instruction generator.

80. A dynamic additive manufacturing system as in clause 53, or any other clause, wherein said proactive control processor evaluatively responsive to as yet unaccomplished item formative data comprises a coded computer processor configured as a proactive control processor.

81. A dynamic additive manufacturing system as in clause 53, or any other clause, wherein said processor transforms data representative of physical movements informative of product formation.

82. A dynamic additive manufacturing system as in clause 53, or any other clause, wherein said processor transforms physical movement of product formation.

83. A dynamic additive manufacturing system as in clause 53, or any other clause, wherein said processor comprises particularized computer hardware configured to transform fabrication of the item.

84. A dynamic additive manufacturing system as in clause 53, or any other clause, wherein said processor is configured to move source material in a different manner than that specified in initial movement instructions.

85. A dynamic additive manufacturing system as in clause 53, or any other clause, wherein said processor comprises a computer-readable storage medium containing computer-readable program instructions for evaluative response to as yet unaccomplished item formative data.

86. A dynamic additive manufacturing system as in any of clauses 1, 27, or 53, or any other clause, wherein said processor comprises a real-time interactive processor.

87. A dynamic additive manufacturing system as in clause 86, or any other clause, wherein said real-time interactive processor comprises an operationally real-time interactive processor.

88. A dynamic additive manufacturing system as in any of clauses 1, 27, or 53, or any other clause, wherein said processor comprises a manufacturing system integral clock.
89. A dynamic additive manufacturing system as in clause 87, or any other clause, wherein said processor comprises a processor configured to refine local movement of said formative process element relative to said fabrication base.
90. A dynamic additive manufacturing system as in clause 89, or any other clause, wherein said processor configured to refine local movement of said formative process element relative to said fabrication base comprises a transformed movement controller.
91. A dynamic additive manufacturing system as in clause 90, or any other clause, wherein said transformed movement controller comprises a fabrication data transformative recalculator.
92. A dynamic additive manufacturing system as in clause 91, or any other clause, wherein said fabrication data transformative recalculator is responsive to traditional fabrication data instructions.
93. A dynamic additive manufacturing system as in any of clauses 1, 27, or 53, or any other clause, wherein said processor comprises altered movement instructions.
94. A dynamic additive manufacturing system as in clause 93, or any other clause, wherein said altered movement instructions comprise optimized movement instructions.
95. A dynamic additive manufacturing system as in clause 93, or any other clause, wherein said altered movement instructions comprise velocity configured movement instructions.
96. A dynamic additive manufacturing system as in clause 93, or any other clause, wherein said altered movement instructions comprise positionally variant movement instructions.
97. A dynamic additive manufacturing system as in clause 94, or any other clause, wherein said optimized movement instructions comprise speed optimized movement instructions.
98. A dynamic additive manufacturing system as in clause 97, or any other clause, wherein said optimized movement instructions comprise predictive movement instructions.
99. A dynamic additive manufacturing system as in clause 98, or any other clause, wherein said speed optimized movement instructions comprise velocity configured movement instructions.
100. A dynamic additive manufacturing system as in clause 98, or any other clause, wherein said speed optimized movement instructions comprise positionally variant movement instructions.
101. A dynamic additive manufacturing system as in clause 93, or any other clause, wherein said altered movement instructions comprise smoothed layup surface movement instructions.
102. A dynamic additive manufacturing system as in clause 98, or any other clause, wherein said smoothed layup surface movement instructions comprise velocity configured movement instructions.
103. A dynamic additive manufacturing system as in clause 98, or any other clause, wherein said smoothed layup surface movement instructions comprise positionally variant movement instructions.
104. A dynamic additive manufacturing system as in clause 98, or any other clause, wherein said processor comprises a look ahead analytic.
105. A dynamic additive manufacturing system as in clause 104, or any other clause, wherein said look ahead analytic comprises a transformant instruction generator.
106. A dynamic additive manufacturing system as in clause 98, or any other clause, wherein said optimized movement instructions comprise a velocity configured movement instructions.
107. A dynamic additive manufacturing system as in clause 98, or any other clause, wherein said optimized movement instructions comprise positionally variant movement instructions.
108. A dynamic additive manufacturing system as in any of clauses 1, 27, 53, or 88, or any other clause, wherein said processor comprises a failsafe activity monitor.
109. A dynamic additive manufacturing system as in clause 88, or any other clause, wherein said processor comprises a failsafe activity monitor.
110. A dynamic additive manufacturing system as in clause 108, or any other clause, wherein said failsafe activity monitor comprises a temporal activity monitor.
111. A dynamic additive manufacturing system as in clause 109, or any other clause, wherein said failsafe activity monitor comprises a temporal activity monitor.
112. A dynamic additive manufacturing system as in clause 110, or any other clause, wherein said temporal activity monitor comprises a pulse train signal sensor.
113. A dynamic additive manufacturing system as in clause 111, or any other clause, wherein said temporal activity monitor comprises a pulse train signal sensor.
114. A dynamic additive manufacturing system as in clause 110, or any other clause, wherein said temporal activity monitor comprises an intelligent platform management interface specification system.
115. A dynamic additive manufacturing system as in clause 111, or any other clause, wherein said temporal activity monitor comprises an intelligent platform management interface specification system.
116. A dynamic additive manufacturing system as in clause 108, or any other clause, further comprising a localized self-reliant disable.
117. A dynamic additive manufacturing system as in clause 109, or any other clause, further comprising a localized self-reliant disable.
118. A dynamic additive manufacturing system as in clause 116, or any other clause, wherein said localized self-reliant disable comprises a disable selected from a group consisting of: a movement shutoff, a heater shutoff, a support shutoff, and a source shutoff.
119. A dynamic additive manufacturing system as in clause 117, or any other clause, wherein said localized self-reliant disable comprises a disable selected from a group consisting of: a movement shutoff, a heater shutoff, a support shutoff, and a source shutoff.
120. A multiformative manufacturing system from which a fabrication item can be formed comprising:
a fabrication support upon which an item can be formed;
a first function formative process element;
a fabrication data input from which fabrication data is provided;
a process element movement system configured to effect positioning of said first function formative process element relative to said fabrication support;
a formative process control that directs item formative processes and to which said process element movement system is responsive;
a second function formative process element; and
a substantially uninterruptive process element changer that operationally changes between said first function formative process element and said second function formative process element.

121. A multiformative manufacturing system as in clause 120, or any other clause, wherein said substantially uninterruptive process element changer that operationally changes between said first function formative process element and said second function formative process element comprises a process element removal and replacement system.

122. A multiformative manufacturing system as in clause 121, or any other clause, wherein said substantially uninterruptive process element changer that operationally changes between said first function formative process element and said second function formative process element comprises a substantially only mechanical change activity interrupt system.

123. A multiformative manufacturing system as in clause 122, or any other clause, wherein said substantially only mechanical change activity interrupt system comprises a change precalculator processor.

124. A multiformative manufacturing system as in clause 123, or any other clause, wherein said change precalculator processor comprises a advance driver transformation processor.

125. A multiformative manufacturing system as in clause 123, or any other clause, wherein said change precalculator processor comprises an interchange movement driver transformation processor.

126. A multiformative manufacturing system as in any of clauses 121, 124, or 125, or any other clause, wherein said processor comprises a specialized process element change capability processor.

127. A multiformative manufacturing system as in clause 126, or any other clause, wherein said specialized process element change capability processor comprises a formative system reserved change capability processor.

128. A multiformative manufacturing system as in clause 127, or any other clause, wherein said formative system reserved change capability processor comprises a manufacturing system integral process element change capability processor.

129. A multiformative manufacturing system as in clause 128, or any other clause, wherein said manufacturing system integral process element change capability processor comprises a processing system limited input-output overhead processor.

130. A multiformative manufacturing system as in clause 128, or any other clause, wherein said manufacturing system integral process element change capability processor comprises a substantially time efficient movement instruction generator.

131. A multiformative manufacturing system as in clause 120, or any other clause, wherein said processor comprises a coded computer processor configured as a substantially uninterruptive process element changer.

132. A multiformative manufacturing system as in clause 120, or any other clause, wherein said processor transforms data representative of physical movements informative of product formation.

133. A multiformative manufacturing system as in clause 120, or any other clause, wherein said processor transforms physical movement of product formation.

134. A multiformative manufacturing system as in clause 120, or any other clause, wherein said processor comprises particularized computer hardware configured to transform fabrication of the item.

135. A multiformative manufacturing system as in clause 120, or any other clause, wherein said processor is configured to move source material in a different manner than that specified in initial movement instructions.

136. A multiformative manufacturing system as in clause 120, or any other clause, wherein said processor comprises a computer-readable storage medium containing computer-readable program instructions for substantially uniterruptive process element change.

137. A multiformative manufacturing system from which a fabrication item can be formed comprising:
a fabrication support upon which an item can be formed;
a fabrication data input from which fabrication data is provided;
a plurality of formative process capabilities responsive to said fabrication data;
a process element movement system configured to effect positioning of said plurality of formative process capabilities relative to said fabrication support;
 a formative process control that directs item formative processes by said plurality of formative process capabilities and to which said process element movement system is responsive; and
an operationally transparent process element changer that operationally alters between said plurality of formative process capabilities.

138. A multiformative manufacturing system as in clause 137, or any other clause, wherein said operationally transparent process element changer that operationally alters between said plurality of formative process capabilities comprises a process element removal and replacement system.

139. A multiformative manufacturing system as in clause 138, or any other clause, wherein said operationally transparent process element changer that operationally alters between said plurality of formative process capabilities comprises a substantially only mechanical change activity interrupt system.

140. A multiformative manufacturing system as in clause 139, or any other clause, wherein said substantially only mechanical change activity interrupt system comprises a change precalculator processor.

141. A multiformative manufacturing system as in clause 140, or any other clause, wherein said change precalculator processor comprises a advance driver transformation processor.

142. A multiformative manufacturing system as in clause 140, or any other clause, wherein said change precalculator processor comprises an interchange movement driver transformation processor.

143. A multiformative manufacturing system as in any of clauses 138, 141, or 142, or any other clause, wherein said processor comprises a specialized process element change capability processor.

144. A multiformative manufacturing system as in clause 143, or any other clause, wherein said specialized process element change capability processor comprises a formative system reserved change capability processor.

145. A multiformative manufacturing system as in clause 144, or any other clause, wherein said formative system reserved change capability processor comprises a manufacturing system integral process element change capability processor.

146. A multiformative manufacturing system as in clause 145, or any other clause, wherein said manufacturing system integral process element change capability processor comprises a processing system limited input-output overhead processor.

147. A multiformative manufacturing system as in clause 145, or any other clause, wherein said manufacturing system integral process element change capability processor comprises a substantially time efficient movement instruction generator.

148. A multiformative manufacturing system as in clause 137, or any other clause, wherein said processor comprises a coded computer processor configured as an operationally transparent process element change capability processor.

149. A multiformative manufacturing system as in clause 137, or any other clause, wherein said processor transforms data representative of physical movements informative of product formation.

150. A multiformative manufacturing system as in clause 137, or any other clause, wherein said processor transforms physical movement of product formation.

151. A multiformative manufacturing system as in clause 137, or any other clause, wherein said processor comprises particularized computer hardware configured to transform fabrication of the item.

152. A multiformative manufacturing system as in clause 137, or any other clause, wherein said processor is configured to move source material in a different manner than that specified in initial movement instructions.

153. A multiformative manufacturing system as in clause 137, or any other clause, wherein said processor comprises a computer-readable storage medium containing computer-readable program instructions for operational alteration.

154. A multiformative manufacturing system as in clause 137, or any other clause, wherein said operationally transparent process element changer that operationally alters between said plurality of formative process capabilities comprises a substantially uninterruptive process element changer that operationally changes between said first function formative process element and said second function formative process element.

155. A multiformative manufacturing system as in any of clauses 120 or 154, or any other clause, wherein said substantially uninterruptive process element changer that operationally changes between said first function formative process element and said second function formative process element comprises an interprocess process element changer.

156. A multiformative manufacturing system as in clause 155, or any other clause, wherein said formative process control that directs item formative processes and to which said process element movement system is responsive comprises a multiple process element action controller and a substantially uninterruptive interprocess process element changer.

157. A multiformative manufacturing system as in clause 155, or any other clause, wherein said interprocess process element changer comprises a no-reset process element changer.

158. A multiformative manufacturing system as in clause 157, or any other clause, wherein said no-reset process element changer comprises a no-reset differential process element changer.

159. A multiformative manufacturing system as in clause 154, or any other clause, wherein said substantially uninterruptive process element changer that operationally changes between said first function formative process element and said second function formative process element comprises a substantially only mechanical change activity interrupt system.

160. A multiformative manufacturing system as in clause 154, or any other clause, wherein said substantially uninterruptive process element changer that operationally changes between said first function formative process element and said second function formative process element comprises a interruption minimization processor.

161. A multiformative manufacturing system as in clause 160, or any other clause, interruption minimization processor comprises a automatic interruption minimization processor.

162. A multiformative manufacturing system as in clause 160, or any other clause, wherein said interruption minimization processor comprises a substantially only mechanical change activity interrupt system.

163. A multiformative manufacturing system as in any of clauses 120 or 137, or any other clause, wherein said process element changer comprises a interprocess process element changer.

164. A multiformative manufacturing system as in clause 163, or any other clause, wherein said formative process control that directs item formative processes and to which said process element movement system is responsive comprises a multiple process element action controller and a substantially uninterruptive interprocess process element changer.

165. A multiformative manufacturing system as in clause 163, or any other clause, wherein said interprocess process element changer comprises a no-reset process element changer.

166. A multiformative manufacturing system as in clause 165, or any other clause, wherein said no-reset process element changer comprises a no-reset differential process element changer.

167. A multiformative manufacturing system as in clause 155, or any other clause, wherein said interprocess process element changer comprises a common driver processor.

168. A multiformative manufacturing system as in clause 167, or any other clause, wherein said common driver processor comprises a common coordinate processor.

169. A multiformative manufacturing system as in clause 167, or any other clause, wherein said common driver processor comprises a coordinate transformation processor.

170. A multiformative manufacturing system as in clause 169, or any other clause, wherein said coordinate transformation processor comprises a coordinate alias processor.

171. A multiformative manufacturing system as in clause 120, or any other clause, wherein said substantially uninterruptive process element changer that operationally changes between said first function formative process element and said second function formative process element comprises a process element change accommodative processor.

172. A multiformative manufacturing system as in any of clauses 120 or 171, or any other clause, wherein said processor comprises a universal process element control processor.

173. A multiformative manufacturing system as in clause 172, or any other clause, wherein said universal process element control processor comprises a movement transformative processor.

174. A multiformative manufacturing system as in clause 173, or any other clause, wherein said movement transformative processor comprises a coordinate alias processor.

175. A multiformative manufacturing system as in clause 171, or any other clause, wherein said process element change accommodative processor comprises a interprocess process element changer.

176. A multiformative manufacturing system as in clause 171, or any other clause, wherein said process element change accommodative processor comprises a no-reset process element changer.
177. A multiformative manufacturing system as in clause 175, or any other clause, wherein said interprocess process element changer comprises a no-reset process element changer.
178. A multiformative manufacturing system as in clause 171, or any other clause, wherein said process element change accommodative processor comprises a interprocess process element changer.
179. A multiformative manufacturing system as in clause 171, or any other clause, wherein said process element change accommodative processor comprises a no-reset process element changer.
180. A multiformative manufacturing system as in clause 178, or any other clause, wherein said interprocess process element changer comprises a no-reset process element changer.
181. A multiformative manufacturing system as in clause 120, or any other clause, wherein said first and second function formative process elements comprise dissimilar function formative process elements.
182. A multiformative manufacturing system as in any of clauses 120 or 181, or any other clause, wherein said first and second function formative process elements comprise dissimilar manufacturer heads.
183. A multiformative manufacturing system as in clause 120, or any other clause, wherein said first and second function formative process elements comprise dissimilar function material removal heads.
184. A multiformative manufacturing system as in clause 120, or any other clause, wherein said first and second function formative process elements comprise dissimilar additive manufacturing heads.
185. A multiformative manufacturing system as in clause 120, or any other clause, wherein said first and second function formative process elements comprise a combination of one or more material removal heads and one or more additive manufacturing heads.
186. A multiformative manufacturing system as in clause 137, or any other clause, wherein said plurality of formative process capabilities comprise dissimilar function formative process capabilities.
187. A multiformative manufacturing system as in any of clauses 137 or 186, or any other clause, wherein said plurality of formative process capabilities comprise dissimilar manufacturer heads.
188. A multiformative manufacturing system as in clause 137, or any other clause, wherein said plurality of formative process capabilities comprise dissimilar function material removal heads.
189. A multiformative manufacturing system as in clause 137, or any other clause, wherein said plurality of formative process capabilities comprise dissimilar additive manufacturing heads.
190. A multiformative manufacturing system as in clause 137, or any other clause, wherein said plurality of formative process capabilities comprise a combination of one or more material removal heads and one or more additive manufacturing heads.
191. A multiformative manufacturing system as in any of clauses 120 or 137, or any other clause, further comprising a peripheral component assurance processor.
192. A multiformative manufacturing system as in clause 191, or any other clause, further comprising a peripheral component warning system.
193. A multiformative manufacturing system as in clause 192, or any other clause, further comprising a peripheral component sensor.
194. A multiformative manufacturing system as in clause 192, or any other clause, further comprising a peripheral component data input.
195. A multiformative manufacturing system as in clause 191, or any other clause, herein said peripheral component assurance processor comprises an automatic peripheral component driver capture system.
196. A multiformative manufacturing system as in clause 191, or any other clause, wherein said peripheral component assurance processor comprises an adequate consumable assurance processor.
197. A multiformative manufacturing system as in any of clauses 120 or 137, or any other clause, further comprising a formative process information display.
198. A multiformative manufacturing system as in clause 197, or any other clause, wherein said formative process information display comprises a formative process information display selected from a group consisting of: an item volume display, an estimated source material amount display, a source material amount display, an estimated build time display, a build time display, and an item weight display.
199. An additive manufacturing system from which a fabrication item can be formed comprising:
a fabrication support upon which an item can be formed;
an additive material source;
a formative process element;
a layup movement system configured to effect positioning of said formative process element relative to said fabrication support;
a fabrication data input from which fabrication data is provided; and
an antecedent activity, postliminary formative control processor responsive to said fabrication data input and to which said layup movement system is responsive.
200. An additive manufacturing system as in clause 199, or any other clause, wherein said antecedent activity, postliminary formative control processor responsive to said fabrication data input and to which said layup movement system is responsive comprises an evaluatively responsive to prior item formative processes processor.
201. An additive manufacturing system as in clause 200, or any other clause, wherein said formative process element comprises a photosolidification formative process element.
202. An additive manufacturing system as in clause 201, or any other clause, wherein said photosolidification formative process element comprises a bottom up photosolidification formative process element.
203. An additive manufacturing system as in clause 202, or any other clause, further comprising a variant item layer reposition system responsive to said antecedent activity, postliminary formative control processor.
204. An additive manufacturing system as in clause 203, or any other clause, wherein said variant item layer reposition system responsive to said antecedent activity, postliminary formative control processor comprises a item structure variant item layer reposition system.
205. An additive manufacturing system as in clause 204, or any other clause, wherein said item structure variant item layer reposition system is responsive to previous fabrication structural characteristics of said item being fabricated.

206. An additive manufacturing system as in clause 205, or any other clause, wherein said variant item layer reposition system responsive to said antecedent activity, postliminary formative control processor comprises a layer surface area responsive variant item layer reposition system.

207. An additive manufacturing system as in clause 205, or any other clause, wherein said variant item layer reposition system responsive to said antecedent activity, postliminary formative control processor comprises a formation speed optimized item layer reposition system.

208. An additive manufacturing system as in any of clauses 205 or 207, or any other clause, wherein said variant item layer reposition system responsive to said antecedent activity, postliminary formative control processor comprises a viscosity variant item layer reposition system.

209. An additive manufacturing system as in clause 208, or any other clause, wherein said variant item layer reposition system responsive to said antecedent activity, postliminary formative control processor comprises a variant item layer reposition system selected from a group consisting of: an item layer area responsive item layer reposition system, a fluid resistance responsive item layer reposition system, a fluid viscosity responsive item layer reposition system, an item mechanical support responsive item layer reposition system, and an item structural integrity responsive item layer reposition system.

210. An additive manufacturing system as in clause 199, or any other clause, wherein said antecedent activity, postliminary formative control processor responsive to said fabrication data input and to which said layup movement system is responsive comprises a coded computer processor configured as an antecedent activity, postliminary formative control processor.

211. An additive manufacturing system as in clause 199, or any other clause, wherein said processor transforms data representative of physical movements informative of product formation.

212. An additive manufacturing system as in clause 199, or any other clause, wherein said processor transforms physical movement of product formation.

213. An additive manufacturing system as in clause 199, or any other clause, wherein said processor comprises particularized computer hardware configured to transform fabrication of the item.

214. An additive manufacturing system as in clause 199, or any other clause, wherein said processor is configured to move source material in a different manner than that specified in initial movement instructions.

215. An additive manufacturing system as in clause 199, or any other clause, wherein said processor comprises a computer-readable storage medium containing computer-readable program instructions for antecedent activity, postliminary formative control.

216. An additive manufacturing system from which a fabrication item can be formed comprising:
a fabrication support upon which an item can be formed;
an additive material source;
a photosolidification formative process element;
a layup functional movement system configured to effect functional positioning for said photosolidification formative process element relative to said fabrication support;
a fabrication data input from which fabrication data is provided; and
a variant item layer reposition system responsive to said fabrication data input.

217. An additive manufacturing system as in clause 216, or any other clause, further comprising an antecedent activity, postliminary formative control processor to which said variant item layer reposition system is responsive.

218. An additive manufacturing system as in any of clauses 216 or 217, or any other clause, wherein said variant item layer reposition system responsive to said fabrication data input comprises an item structure variant item layer reposition system.

219. An additive manufacturing system as in clause 218, or any other clause, wherein said item structure variant item layer reposition system is responsive to previous fabrication structural characteristics of said item being fabricated.

220. An additive manufacturing system as in clause 216, or any other clause, wherein said variant item layer reposition system responsive to said fabrication data input comprises a source material variant item layer reposition system.

221. An additive manufacturing system as in any of clauses 216 or 217, or any other clause, wherein said source material variant item layer reposition system comprises a source viscosity variant item layer reposition system.

222. An additive manufacturing system as in clause 216, or any other clause, further comprising a source material viscosity sensor.

223. An additive manufacturing system as in clause 216, or any other clause, wherein said variant item layer reposition system responsive to said fabrication data input comprises a coded computer processor configured as a variant item layer reposition system processor.

224. An additive manufacturing system as in clause 216, or any other clause, wherein said processor transforms data representative of physical movements informative of product formation.

225. An additive manufacturing system as in clause 216, or any other clause, wherein said processor transforms physical movement of product formation.

226. An additive manufacturing system as in clause 216, or any other clause, wherein said processor comprises particularized computer hardware configured to transform fabrication of the item.

227. An additive manufacturing system as in clause 216, or any other clause, wherein said processor is configured to move source material in a different manner than that specified in initial movement instructions.

228. An additive manufacturing system as in clause 216, or any other clause, wherein said processor comprises a computer-readable storage medium containing computer-readable program instructions for variant item layer reposition.

229. An additive manufacturing system from which a fabrication item can be formed comprising:
a fabrication support upon which an item can be formed;
a plurality of additive material source configuration functionalities;
a formative process element;
a layup functional movement system configured to effect functional positioning for said formative process element relative to said fabrication support;
a fabrication data input from which fabrication data is provided; and
a user reconfigurable multiple source material formative process control responsive to at least one of said additive material source configuration functionalities, and to which said layup functional movement system is responsive.

230. An additive manufacturing system as in clause 229, or any other clause, wherein said user reconfigurable multiple source material formative process control responsive to at least one of said additive material source configuration functionalities, and to which said layup functional movement system is responsive comprises a user multiple source material reconfigurable multisource processor.

231. An additive manufacturing system as in clause 230, or any other clause, wherein said user multiple source material reconfigurable multisource processor is responsive to said fabrication data input and to which said layup functional movement system is responsive.

232. An additive manufacturing system as in clause 231, or any other clause, wherein said fabrication data input from which fabrication data is provided comprises a user fabrication information input.

233. An additive manufacturing system as in clause 232, or any other clause, wherein said user reconfigurable multiple source material formative process control responsive to at least one of said additive material source configuration functionalities, and to which said layup functional movement system is responsive comprises an automatic source material reconfiguration processor.

234. An additive manufacturing system as in clause 231, or any other clause, further comprising a source material viscosity sensor.

235. An additive manufacturing system as in clause 229, or any other clause, wherein said user reconfigurable multiple source material formative process control responsive to at least one of said additive material source configuration functionalities, and to which said layup functional movement system is responsive comprises a coded computer processor configured as a user reconfigurable multiple source material formative process control responsive to at least one of said additive material source configuration functionalities, and to which said layup functional movement system is responsive.

236. An additive manufacturing system as in clause 229, or any other clause, wherein said processor transforms data representative of physical movements informative of product formation.

237. An additive manufacturing system as in clause 229, or any other clause, wherein said processor transforms physical movement of product formation.

238. An additive manufacturing system as in clause 229, or any other clause, wherein said processor comprises particularized computer hardware configured to transform fabrication of the item.

239. An additive manufacturing system as in clause 229, or any other clause, wherein said processor is configured to move source material in a different manner than that specified in initial movement instructions.

240. An additive manufacturing system as in clause 229, or any other clause, wherein said processor comprises a computer-readable storage medium containing computer-readable program instructions for user reconfigurable multiple source material formative process control.

241. A method of dynamic additive manufacture of a fabrication item comprising the steps of:
providing a fabrication support upon which an item can be formed;
utilizing fabrication information indicative of said fabrication item;
supplying an additive material to a formative process element;
indicating an initial fabrication movement;
transforming said initial fabrication movement to a refined fabrication movement;
controlling movement of said formative process element by said refined fabrication movement; moving said formative process element relative to said fabrication support according to said refined fabrication movement;
depositing some of said additive material at a desired location; and
forming said fabrication item according to said refined fabrication movement.

242. A method of dynamic additive manufacture as in clause 241, or any other clause, wherein said step of transforming said initial fabrication movement to a refined fabrication movement comprises the step of transforming initial fabrication instructions to refined fabrication instructions.

243. A method of dynamic additive manufacture as in clause 242, or any other clause, wherein said step of transforming initial fabrication instructions to refined fabrication instructions comprises the step of proactively controlling movement of said formative process element in response to as yet unaccomplished item formative data.

244. A method of dynamic additive manufacture as in clause 241, or any other clause, wherein said step of transforming said initial fabrication movement to a refined fabrication movement comprises the step of generating transformant instructions.

245. A method of dynamic additive manufacture as in clause 241, or any other clause, wherein said step of indicating an initial fabrication movement comprises the step of instructing initial movement and wherein said step of transforming said initial fabrication movement to a refined fabrication movement comprises the step of altering movement instructions to control movement of said formative process element.

246. A method of dynamic additive manufacture as in clause 245, or any other clause, wherein said step of altering movement instructions comprises the step of instructing approximate movement.

247. A method of dynamic additive manufacture as in clause 246, or any other clause, wherein said step of instructing approximate movement comprises the step of instructing positionally variant movement.

248. A method of dynamic additive manufacture as in clause 247, or any other clause, wherein said step of instructing approximate movement comprises the step of instructing deviation tolerance movement.

249. A method of dynamic additive manufacture as in clause 245, or any other clause, wherein said step of altering movement instructions comprises the step of instructing velocity configured movement.

250. A method of dynamic additive manufacture as in any of clauses 245, 246, or 248, or any other clause, wherein said step of altering movement instructions comprises the step of instructing curvilinear movement.

251. A method of dynamic additive manufacture as in clause 245, or any other clause, wherein said step of altering movement instructions comprises the step of instructing velocity configured movement.

252. A method of dynamic additive manufacture as in clause 244, or any other clause, wherein said step of generating transformant instructions comprises the step of generating trajectory planned instructions.

253. A method of dynamic additive manufacture as in clause 252, or any other clause, wherein said step of generating trajectory planned instructions comprises the step of generating curvilinear movement instructions.

254. A method of dynamic additive manufacture as in clause 244, or any other clause, wherein said step of generating transformant instructions comprises the step of generating velocity optimized movement.

255. A method of dynamic additive manufacture as in clause 254, or any other clause, wherein said step of generating velocity optimized movement comprises the step of generating constant tangential velocity movement.

256. A method of dynamic additive manufacture as in clause 241, or any other clause, wherein said step of transforming said initial fabrication movement to a refined fabrication movement comprises the step of specialized processor transforming said initial fabrication movement to a refined fabrication movement.

257. A method of dynamic additive manufacture as in clause 256, or any other clause, wherein said step of specialized processor transforming said initial fabrication movement to a refined fabrication movement comprises the step of formative system reserved processor transforming said initial fabrication movement to a refined fabrication movement.

258. A method of dynamic additive manufacture as in clause 257, or any other clause, wherein said step of formative system reserved processor transforming said initial fabrication movement to a refined fabrication movement comprises the step of manufacturing system integral processor transforming said initial fabrication movement to a refined fabrication movement.

259. A method of dynamic additive manufacture as in clause 258, or any other clause, wherein said step of manufacturing system integral processor transforming said initial fabrication movement to a refined fabrication movement comprises the step of processing system limited input-output overhead processor transforming said initial fabrication movement to a refined fabrication movement.

260. A method of dynamic additive manufacture as in clause 258, or any other clause, wherein said step of manufacturing system integral processor transforming said initial fabrication movement to a refined fabrication movement comprises the step of generating substantially time efficient movement instructions.

261. A method of dynamic additive manufacture as in clause 241, or any other clause, wherein said step of transforming said initial fabrication movement to a refined fabrication movement comprises the step of configuring a coded computer processor as a movement transformation processor.

262. A method of dynamic additive manufacture as in clause 241, or any other clause, wherein said step of transforming said initial fabrication movement to a refined fabrication movement comprises the step of transforming data representative of physical movements informative of product formation.

263. A method of dynamic additive manufacture as in clause 241, or any other clause, wherein said step of transforming said initial fabrication movement to a refined fabrication movement comprises the step of transforming physical movement of product formation.

264. A method of dynamic additive manufacture as in clause 241, or any other clause, wherein said step of transforming said initial fabrication movement to a refined fabrication movement comprises the step of configuring particularized computer hardware to transform fabrication of the item.

265. A method of dynamic additive manufacture as in clause 241, or any other clause, wherein said step of transforming said initial fabrication movement to a refined fabrication movement comprises the step of configuring a processor to move source material in a different manner than that specified in initial movement instructions.

266. A method of dynamic additive manufacture as in clause 241, or any other clause, wherein said step of transforming said initial fabrication movement to a refined fabrication movement comprises the step of providing computer-readable program instructions for movement transformation via a computer-readable storage medium.

267. A method of dynamic additive manufacture of a fabrication item comprising the steps of:
providing a fabrication support upon which an item can be formed;
utilizing fabrication information indicative of said fabrication item;
supplying an additive material to a formative process element;
establishing initial fabrication instructions;
transforming said initial fabrication instructions to refined fabrication instructions;
controlling movement of said formative process element by said refined fabrication instructions; moving said formative process element relative to said fabrication support according to said refined fabrication instructions;
depositing some of said additive material at a desired location; and
forming said fabrication item according to said refined fabrication instructions.

268. A method of dynamic additive manufacture as in clause 267, or any other clause, wherein said step of transforming said initial fabrication instructions to refined fabrication instructions comprises the step of transforming initial fabrication movement to a refined fabrication movement.

269. A method of dynamic additive manufacture as in clause 268, or any other clause, wherein said step of transforming initial fabrication movement to a refined fabrication movement comprises the step of proactively controlling movement of said formative process element in response to as yet unaccomplished item formative data.

270. A method of dynamic additive manufacture as in clause 267, or any other clause, wherein said step of transforming said initial fabrication instructions to refined fabrication instructions comprises the step of generating transformant instructions.

271. A method of dynamic additive manufacture as in clause 267, or any other clause, wherein said step of establishing initial fabrication instructions comprises the step of instructing initial movement and wherein said step of transforming said initial fabrication instructions to refined fabrication instructions comprises the step of altering movement instructions to control movement of said formative process element.

272. A method of dynamic additive manufacture as in clause 271, or any other clause, wherein said step of altering movement instructions comprises the step of instructing approximate movement.

273. A method of dynamic additive manufacture as in clause 272, or any other clause, wherein said step of instructing approximate movement comprises the step of instructing positionally variant movement.

274. A method of dynamic additive manufacture as in clause 273, or any other clause, wherein said step of instructing approximate movement comprises the step of instructing deviation tolerance movement.

275. A method of dynamic additive manufacture as in clause 271, or any other clause, wherein said step of altering movement instructions comprises the step of instructing velocity configured movement.

276. A method of dynamic additive manufacture as in any of clauses 271, 272, or 274, or any other clause, wherein said step of altering movement instructions comprises the step of instructing curvilinear movement.

277. A method of dynamic additive manufacture as in clause 271, or any other clause, wherein said step of altering movement instructions comprises the step of instructing velocity configured movement.

278. A method of dynamic additive manufacture as in clause 270, or any other clause, wherein said step of generating transformant instructions comprises the step of generating trajectory planned instructions.

279. A method of dynamic additive manufacture as in clause 278, or any other clause, wherein said step of generating trajectory planned instructions comprises the step of generating curvilinear movement instructions.

280. A method of dynamic additive manufacture as in clause 270, or any other clause, wherein said step of generating transformant instructions comprises the step of generating velocity optimized movement.

281. A method of dynamic additive manufacture as in clause 280, or any other clause, wherein said step of generating velocity optimized movement comprises the step of generating constant tangential velocity movement.

282. A method of dynamic additive manufacture as in clause 267, or any other clause, wherein said step of transforming said initial fabrication instructions to refined fabrication instructions comprises the step of specialized processor transforming said initial fabrication instructions to refined fabrication instructions.

283. A method of dynamic additive manufacture as in clause 282, or any other clause, wherein said step of specialized processor transforming said initial fabrication instructions to refined fabrication instructions comprises the step of formative system reserved processor transforming said initial fabrication instructions to refined fabrication instructions.

284. A method of dynamic additive manufacture as in clause 283, or any other clause, wherein said step of formative system reserved processor transforming said initial fabrication instructions to refined fabrication instructions comprises the step of manufacturing system integral processor transforming said initial fabrication instructions to refined fabrication instructions.

285. A method of dynamic additive manufacture as in clause 284, or any other clause, wherein said step of manufacturing system integral processor transforming said initial fabrication instructions to refined fabrication instructions comprises the step of processing system limited input-output overhead processor transforming said initial fabrication instructions to refined fabrication instructions.

286. A method of dynamic additive manufacture as in clause 284, or any other clause, wherein said step of manufacturing system integral processor transforming said initial fabrication instructions to refined fabrication instructions comprises the step of generating substantially time efficient movement instructions.

287. A method of dynamic additive manufacture as in clause 267, or any other clause, wherein said step of transforming said initial fabrication instructions to refined fabrication instructions comprises the step of configuring a coded computer processor as a command transformation processor.

288. A method of dynamic additive manufacture as in clause 267, or any other clause, wherein said step of transforming said initial fabrication instructions to refined fabrication instructions comprises the step of transforming data representative of physical movements informative of product formation.

289. A method of dynamic additive manufacture as in clause 267, or any other clause, wherein said step of transforming said initial fabrication instructions to refined fabrication instructions comprises the step of transforming physical movement of product formation.

290. A method of dynamic additive manufacture as in clause 267, or any other clause, wherein said step of transforming said initial fabrication instructions to refined fabrication instructions comprises the step of configuring particularized computer hardware to transform fabrication of the item.

291. A method of dynamic additive manufacture as in clause 267, or any other clause, wherein said step of transforming said initial fabrication instructions to refined fabrication instructions comprises the step of configuring a processor to move source material in a different manner than that specified in initial movement instructions.

292. A method of dynamic additive manufacture as in clause 267, or any other clause, wherein said step of transforming said initial fabrication instructions to refined fabrication instructions comprises the step of providing computer-readable program instructions for movement transformation via a computer-readable storage medium.

293. A method of dynamic additive manufacture of a fabrication item comprising the steps of:
providing a fabrication support upon which an item can be formed;
establishing fabrication data indicative of said fabrication item;
providing item formative data from said fabrication data;
supplying an additive material to a formative process element;
proactively controlling movement of said formative process element in response to as yet unaccomplished item formative data;
moving said formative process element relative to said fabrication support according to said step of proactively controlling movement of said formative process element;
depositing some of said additive material at a desired location; and
forming said fabrication item according to said fabrication data.

294. A method of dynamic additive manufacture as in clause 293, or any other clause, wherein said step of proactively controlling movement of said formative process element in response to as yet unaccomplished item formative data comprises the step of transforming initial fabrication movement to a refined fabrication movement.

295. A method of dynamic additive manufacture as in clause 294, or any other clause, wherein said step of transforming initial fabrication movement to a refined fabrication movement comprises the step of transforming initial fabrication instructions to refined fabrication instructions.

296. A method of dynamic additive manufacture as in clause 293, or any other clause, wherein said step of proactively controlling movement of said formative process element in response to as yet unaccomplished item formative data comprises the step of dynamically interactive controlling movement of said formative process element in response to as yet unaccomplished item formative data.

297. A method of dynamic additive manufacture as in clause 293, or any other clause, wherein said step of proactively controlling movement of said formative process element in response to as yet unaccomplished item formative data comprises the step of predictively responsive controlling movement of said formative process element in response to as yet unaccomplished item formative data.

298. A method of dynamic additive manufacture as in clause 293, or any other clause, wherein said step of establishing fabrication data indicative of said fabrication item comprises the step of instructing initial movement and wherein said step of proactively controlling movement of said formative process element in response to as yet unaccomplished item formative data comprises the step of generating trajectory planned instructions.

299. A method of dynamic additive manufacture as in clause 297, or any other clause, wherein said step of predictively responsive controlling movement of said formative process element in response to as yet unaccomplished item formative data comprises the step of predictively instructing movement.

300. A method of dynamic additive manufacture as in clause 299, or any other clause, wherein said step of predictively responsive controlling movement of said formative process element in response to as yet unaccomplished item formative data comprises the step of look ahead analyzing.

301. A method of dynamic additive manufacture as in clause 300, or any other clause, wherein said step of look ahead analyzing comprises the step of generating transformant instructions.

302. A method of dynamic additive manufacture as in clause 301, or any other clause, wherein said step of look ahead analyzing further comprises the step of instructing velocity configured movement.

303. A method of dynamic additive manufacture as in clause 301, or any other clause, wherein said step of look ahead analyzing further comprises the step of instructing positionally variant movement.

304. A method of dynamic additive manufacture as in clause 293, or any other clause, wherein said step of establishing fabrication data indicative of said fabrication item comprises the step of instructing initial movement and wherein said step of proactively controlling movement of said formative process element in response to as yet unaccomplished item formative data comprises the step of altering movement instructions to control movement of said formative process element.

305. A method of dynamic additive manufacture as in clause 304, or any other clause, wherein said step of altering movement instructions comprises the step of instructing approximate movement.

306. A method of dynamic additive manufacture as in clause 305, or any other clause, wherein said step of instructing approximate movement comprises the step of instructing positionally variant movement.

307. A method of dynamic additive manufacture as in clause 306, or any other clause, wherein said step of instructing approximate movement comprises the step of instructing deviation tolerance movement.

308. A method of dynamic additive manufacture as in clause 304, or any other clause, wherein said step of altering movement instructions comprises the step of instructing velocity configured movement.

309. A method of dynamic additive manufacture as in any of clauses 304, 305, or 307, or any other clause, wherein said step of altering movement instructions comprises the step of instructing curvilinear movement.

310. A method of dynamic additive manufacture as in clause 304, or any other clause, wherein said step of altering movement instructions comprises the step of instructing velocity configured movement.

311. A method of dynamic additive manufacture as in clause 301, or any other clause, wherein said step of generating transformant instructions comprises the step of generating trajectory planned instructions.

312. A method of dynamic additive manufacture as in clause 311, or any other clause, wherein said step of generating trajectory planned instructions comprises the step of generating curvilinear movement instructions.

313. A method of dynamic additive manufacture as in clause 302, or any other clause, wherein said step of instructing velocity configured movement comprises the step of generating velocity optimized movement.

314. A method of dynamic additive manufacture as in clause 313, or any other clause, wherein said step of generating velocity optimized movement comprises the step of generating constant tangential velocity movement.

315. A method of dynamic additive manufacture as in clause 293, or any other clause, wherein said step of proactively controlling movement of said formative process element in response to as yet unaccomplished item formative data comprises the step of specialized processor proactive controlling movement of said formative process element in response to as yet unaccomplished item formative data.

316. A method of dynamic additive manufacture as in clause 315, or any other clause, wherein said step of specialized processor proactive controlling movement of said formative process element in response to as yet unaccomplished item formative data comprises the step of formative system reserved processor proactive controlling movement of said formative process element in response to as yet unaccomplished item formative data.

317. A method of dynamic additive manufacture as in clause 316, or any other clause, wherein said step of formative system reserved processor proactive controlling movement of said formative process element in response to as yet unaccomplished item formative data comprises the step of manufacturing system integral processor proactive controlling movement of said formative process element in response to as yet unaccomplished item formative data.

318. A method of dynamic additive manufacture as in clause 317, or any other clause, wherein said step of manufacturing system integral processor proactive controlling movement of said formative process element in response to as yet unaccomplished item formative data comprises the step of processing system limited input-output overhead processor proactive controlling movement of said formative process element in response to as yet unaccomplished item formative data.

319. A method of dynamic additive manufacture as in clause 317, or any other clause, wherein said step of manufacturing system integral processor proactive controlling movement of said formative process element in response to as yet unaccomplished item formative data comprises the step of generating substantially time efficient movement instructions.

320. A method of dynamic additive manufacture as in clause 293, or any other clause, wherein said step of proactively controlling movement of said formative process element in response to as yet unaccomplished item formative data comprises the step of configuring a coded computer processor as a proactive control processor.

321. A method of dynamic additive manufacture as in clause 293, or any other clause, wherein said step of proactively controlling movement of said formative process element in response to as yet unaccomplished item formative data comprises the step of transforming data representative of physical movements informative of product formation.

322. A method of dynamic additive manufacture as in clause 293, or any other clause, wherein said step of proactively controlling movement of said formative process element in response to as yet unaccomplished item formative data comprises the step of transforming physical movement of product formation.

323. A method of dynamic additive manufacture as in clause 293, or any other clause, wherein said step of proactively controlling movement of said formative process element in response to as yet unaccomplished item formative data comprises the step of configuring particularized computer hardware to transform fabrication of the item.

324. A method of dynamic additive manufacture as in clause 293, or any other clause, wherein said step of proactively controlling movement of said formative process element in response to as yet unaccomplished item formative data comprises the step of configuring a processor to move source material in a different manner than that specified in initial movement instructions.

325. A method of dynamic additive manufacture as in clause 293, or any other clause, wherein said step of proactively controlling movement of said formative process element in response to as yet unaccomplished item formative data comprises the step of providing computer-readable program instructions for movement transformation via a computer-readable storage medium.

326. A method of dynamic additive manufacture as in any of clauses 241, 267, or 293, or any other clause, wherein said step of controlling movement of said formative process element comprises the step of real-time interactive controlling movement of said formative process element.

327. A method of dynamic additive manufacture as in clause 326, or any other clause, wherein said step of real-time interactive controlling movement of said formative process element comprises the step of operationally real-time interactive controlling movement of said formative process element.

328. A method of dynamic additive manufacture as in any of clauses 241, 267, or 293, or any other clause, wherein said step of controlling movement of said formative process element comprises the step of manufacturing system integral processor timekeeping.

329. A method of dynamic additive manufacture as in clause 327, or any other clause, wherein said step of controlling movement of said formative process element comprises the step of refining local movement of said formative process element relative to said fabrication base.

330. A method of dynamic additive manufacture as in clause 329, or any other clause, wherein said step of refining local movement of said formative process element relative to said fabrication base comprises the step of controlling transformed movement.

331. A method of dynamic additive manufacture as in clause 330, or any other clause, wherein said step of controlling transformed movement comprises the step of recalculating transformative fabrication data.

332. A method of dynamic additive manufacture as in clause 331, or any other clause, wherein said step of recalculating transformative fabrication data comprises the step of responding to traditional fabrication data instructions.

333. A method of dynamic additive manufacture as in any of clauses 241, 267, or 293, or any other clause, wherein said step of controlling movement of said formative process element comprises the step of altering movement instructions.

334. A method of dynamic additive manufacture as in clause 333, or any other clause, wherein said step of altering movement instructions comprises the step of optimizing movement instructions.

335. A method of dynamic additive manufacture as in clause 333, or any other clause, wherein said step of altering movement instructions comprises the step of instructing velocity configured movement.

336. A method of dynamic additive manufacture as in clause 333, or any other clause, wherein said step of altering movement instructions comprises the step of instructing positionally variant movement.

337. A method of dynamic additive manufacture as in clause 334, or any other clause, wherein said step of optimizing movement instructions comprises the step of speed optimizing movement instructions.

338. A method of dynamic additive manufacture as in clause 337, or any other clause, wherein said step of optimizing movement instructions comprises the step of predictively instructing movement.

339. A method of dynamic additive manufacture as in clause 338, or any other clause, wherein said step of speed optimizing movement instructions comprises the step of instructing velocity configured movement.

340. A method of dynamic additive manufacture as in clause 338, or any other clause, wherein said step of speed optimizing movement instructions comprises the step of instructing positionally variant movement.

341. A method of dynamic additive manufacture as in clause 333, or any other clause, wherein said step of altering movement instructions comprises the step of smoothing layup surface movement.

342. A method of dynamic additive manufacture as in clause 338, or any other clause, wherein said step of smoothing layup surface movement comprises the step of instructing velocity configured movement.

343. A method of dynamic additive manufacture as in clause 338, or any other clause, wherein said step of smoothing layup surface movement comprises the step of instructing positionally variant movement.

344. A method of dynamic additive manufacture as in clause 338, or any other clause, wherein said step of predictively instructing movement comprises the step of look ahead analyzing.

345. A method of dynamic additive manufacture as in clause 344, or any other clause, wherein said step of look ahead analyzing comprises the step of generating transformant instructions.

346. A method of dynamic additive manufacture as in clause 338, or any other clause, wherein said step of optimizing movement instructions comprises the step of instructing velocity configured movement.

347. A method of dynamic additive manufacture as in clause 338, or any other clause, wherein said step of optimizing movement instructions comprises the step of instructing positionally variant movement.

348. A method of dynamic additive manufacture as in any of clauses 241, 267, 293, or 328, or any other clause, wherein said step of controlling movement of said formative process element comprises the step of failsafe activity monitoring.

349. A method of dynamic additive manufacture as in clause 328, or any other clause, wherein said step of controlling movement of said formative process element comprises the step of failsafe activity monitoring.

350. A method of dynamic additive manufacture as in clause 348, or any other clause, wherein said step of failsafe activity monitoring comprises the step of monitoring temporal activity.

351. A method of dynamic additive manufacture as in clause 349, or any other clause, wherein said step of failsafe activity monitoring comprises the step of monitoring temporal activity.

352. A method of dynamic additive manufacture as in clause 350, or any other clause, wherein said step of monitoring temporal activity comprises the step of sensing a pulse train signal.

353. A method of dynamic additive manufacture as in clause 351, or any other clause, wherein said step of monitoring temporal activity comprises the step of sensing a pulse train signal.
354. A method of dynamic additive manufacture as in clause 350, or any other clause, wherein said step of monitoring temporal activity comprises the step of establishing an intelligent platform management interface specification system.
355. A method of dynamic additive manufacture as in clause 351, or any other clause, wherein said step of monitoring temporal activity comprises the step of establishing an intelligent platform management interface specification system.
356. A method of dynamic additive manufacture as in clause 348, or any other clause, further comprising the step of localized self-reliant disabling.
357. A method of dynamic additive manufacture as in clause 349, or any other clause, further comprising the step of localized self-reliant disabling.
358. A method of dynamic additive manufacture as in clause 356, or any other clause, wherein said step of localized self-reliant disabling comprises a step selected from the group consisting of: the step of shutting off movement, the step of shutting off a heater, the step of shutting off a support, and the step of shutting off a source.
359. A method of dynamic additive manufacture as in clause 357, or any other clause, wherein said step of localized self-reliant disabling comprises a step selected from the group consisting of: the step of shutting off movement, the step of shutting off a heater, the step of shutting off a support, and the step of shutting off a source.
360. A method of dynamic additive manufacture as in any of clauses 241, 267, or 293, or any other clause, wherein said step of moving said formative process element comprises the step of velocity moving said formative process element.
361. A method of dynamic additive manufacture as in clause 360, or any other clause, wherein said step of velocity moving said formative process element comprises the step of constant velocity moving said formative process element.
362. A method of dynamic additive manufacture as in clause 361, or any other clause, wherein said step of constant velocity moving said formative process element comprises the step of constant tangential velocity moving said formative process element.
363. A method of multiformative manufacture of a fabrication item comprising the steps of:
providing a fabrication support upon which an item can be formed;
supplying additive material to a first function formative process element;
positioning said first function formative process element relative to said fabrication support;
controlling said step of positioning said first function formative process element relative to said fabrication support;
at least partially forming said fabrication item by action of said first function formative process element;
substantially uninterruptively changing to a second function formative process element; and
at least partially forming said fabrication item by action of said second function formative process element.
364 A method of multiformative manufacture as in clause 363, or any other clause, wherein said step of substantially uninterruptively changing to a second function formative process element comprises the steps of: removing said first function formative process element; and replacing it with said second function formative process element.
365. A method of multiformative manufacture as in clause 364, or any other clause, wherein said step of substantially uninterruptively changing to a second function formative process element comprises the step of substantially only mechanical change activity interruptively changing to a second function formative process element.
366. A method of multiformative manufacture as in clause 365, or any other clause, wherein said step of substantially only mechanical change activity interruptively changing to a second function formative process element comprises the step of processor change precalculating.
367. A method of multiformative manufacture as in clause 366, or any other clause, wherein said step of processor change precalculating comprises the step of advance driver transforming.
368. A method of multiformative manufacture as in clause 366, or any other clause, wherein said step of processor change precalculating comprises the step of interchange movement driver transforming.
369. A method of multiformative manufacture as in any of clauses 364, 367, or 368, or any other clause, wherein said step of substantially uninterruptively changing to a second function formative process element comprises the step of specialized processor process element changing.
370. A method of multiformative manufacture as in clause 369, or any other clause, wherein said step of specialized processor process element changing comprises the step of formative system reserved processor changing.
371. A method of multiformative manufacture as in clause 370, or any other clause, wherein said step of formative system reserved processor changing comprises the step of manufacturing system integral processor changing.
372. A method of multiformative manufacture as in clause 371, or any other clause, wherein said step of manufacturing system integral processor changing comprises the step of processing system limited input-output overhead processor changing.
373. A method of multiformative manufacture as in clause 371, or any other clause, wherein said step of manufacturing system integral processor changing comprises the step of generating substantially time efficient movement instructions.
374. A method of multiformative manufacture as in clause 363, or any other clause, wherein said step of substantially uninterruptively changing to a second function formative process element comprises the step of configuring a coded computer processor as a substantially uninterruptive process element change processor.
375. A method of multiformative manufacture as in clause 363, or any other clause, wherein said step of substantially uninterruptively changing to a second function formative process element comprises the step of transforming data representative of physical movements informative of product formation.
376. A method of multiformative manufacture as in clause 363, or any other clause, wherein said step of substantially uninterruptively changing to a second function formative process element comprises the step of transforming physical movement of product formation.
377. A method of multiformative manufacture as in clause 363, or any other clause, wherein said step of substantially uninterruptively changing to a second function formative process element comprises the step of configuring particularized computer hardware to transform fabrication of the item.
378. A method of multiformative manufacture as in clause 363, or any other clause, wherein said step of substantially uninterruptively changing to a second function formative process element comprises the step of configuring a processor to move source material in a different manner than that specified in initial movement instructions.

379. A method of multiformative manufacture as in clause 363, or any other clause, wherein said step of substantially uninterruptively changing to a second function formative process element comprises the step of providing computer-readable program instructions for movement transformation via a computer-readable storage medium.

380. A method of multiformative manufacture of a fabrication item comprising the steps of:
providing a fabrication support upon which an item can be formed;
establishing a plurality of formative process capabilities in vicinity of said fabrication support;
establishing a movement system configured to effect positioning of said plurality of formative process capabilities relative to said fabrication support;
removably attaching a first of said plurality of formative process capabilities to said movement system;
positioning said first of said plurality of formative process capabilities relative to said fabrication support;
controlling said step of positioning said plurality of formative process capabilities relative to said fabrication support;
at least partially forming said fabrication item by action of said first of said plurality of formative process capabilities;
operationally transparently switching between said first of said plurality of formative process capabilities and a second of said plurality of formative process capabilities; and
further forming said fabrication item by action of said second of said plurality of formative process capabilities.

381. A method of multiformative manufacture as in clause 380, or any other clause, wherein said step of operationally transparently switching between said first of said plurality of formative process capabilities and a second of said plurality of formative process capabilities comprises the steps of:
removing said first of said plurality of formative process capabilities; and replacing it with said second of said plurality of formative process capabilities.

382. A method of multiformative manufacture as in clause 381, or any other clause, wherein said step of operationally transparently switching between said first of said plurality of formative process capabilities and a second of said plurality of formative process capabilities comprises the step of substantially only mechanical change activity interruptively switching between said first of said plurality of formative process capabilities and said second of said plurality of formative process capabilities.

383. A method of multiformative manufacture as in clause 382, or any other clause, wherein said step of substantially only mechanical change activity interruptively switching between said first of said plurality of formative process capabilities and said second of said plurality of formative process capabilities comprises the step of processor change precalculating.

384. A method of multiformative manufacture as in clause 383, or any other clause, wherein said step of processor change precalculating comprises the step of advance driver transforming.

385. A method of multiformative manufacture as in clause 383, or any other clause, wherein said step of processor change precalculating comprises the step of interchange movement driver transforming.

386. A method of multiformative manufacture as in any of clauses 381, 384, or 385, or any other clause, wherein said step of operationally transparently switching between said first of said plurality of formative process capabilities and a second of said plurality of formative process capabilities comprises the step of specialized processor formative process capability changing.

387. A method of multiformative manufacture as in clause 386, or any other clause, wherein said step of specialized processor formative process capability changing comprises the step of formative system reserved processor formative process capability changing.

388. A method of multiformative manufacture as in clause 387, or any other clause, wherein said step of formative system reserved processor formative process capability changing comprises the step of manufacturing system integral processor formative process capability changing.

389. A method of multiformative manufacture as in clause 388, or any other clause, wherein said step of manufacturing system integral processor formative process capability changing comprises the step of processing system limited input-output overhead processor changing.

390. A method of multiformative manufacture as in clause 388, or any other clause, wherein said step of manufacturing system integral processor formative process capability changing comprises the step of generating substantially time efficient movement instructions.

391. A method of multiformative manufacture as in clause 380, or any other clause, wherein said step of operationally transparently switching between said first of said plurality of formative process capabilities and a second of said plurality of formative process capabilities comprises the step of configuring a coded computer processor as an operationally transparent formative process capability change processor.

392. A method of multiformative manufacture as in clause 380, or any other clause, wherein said step of operationally transparently switching between said first of said plurality of formative process capabilities and a second of said plurality of formative process capabilities comprises the step of transforming data representative of physical movements informative of product formation.

393. A method of multiformative manufacture as in clause 380, or any other clause, wherein said step of operationally transparently switching between said first of said plurality of formative process capabilities and a second of said plurality of formative process capabilities comprises the step of transforming physical movement of product formation.

394. A method of multiformative manufacture as in clause 380, or any other clause, wherein said step of operationally transparently switching between said first of said plurality of formative process capabilities and a second of said plurality of formative process capabilities comprises the step of configuring particularized computer hardware to transform fabrication of the item.

395. A method of multiformative manufacture as in clause 380, or any other clause, wherein said step of operationally transparently switching between said first of said plurality of formative process capabilities and a second of said plurality of formative process capabilities comprises the step of configuring a processor to move source material in a different manner than that specified in initial movement instructions.

396. A method of multiformative manufacture as in clause 380, or any other clause, wherein said step of operationally transparently switching between said first of said plurality of formative process capabilities and a second of said plurality of formative process capabilities providing computer-readable program instructions for movement transformation via a computer-readable storage medium.

397. A method of multiformative manufacture as in clause 380, or any other clause, wherein said step of operationally transparently switching between said first of said plurality of formative process capabilities and a second of said plurality of formative process capabilities comprises the step of physically switching between said first of said plurality of formative process capabilities and a second of said plurality of formative process capabilities.

398. A method of multiformative manufacture as in clause 397, or any other clause, wherein said step of physically switching between said first of said plurality of formative process capabilities and a second of said plurality of formative process capabilities comprises the step of removing said first of said plurality of formative process capabilities and replacing it with said second of said plurality of formative process capabilities.

399. A method of multiformative manufacture as in clause 380, or any other clause, wherein said step of operationally transparently switching between said first of said plurality of formative process capabilities and a second of said plurality of formative process capabilities comprises the step of substantially uninterruptively changing.

400. A method of multiformative manufacture as in any of clauses 363 or 399, or any other clause, wherein said step of substantially uninterruptively changing comprises the step of interprocess process element changing.

401. A method of multiformative manufacture as in clause 400, or any other clause, wherein said step of controlling comprises the steps of: controlling action of multiple process elements; and substantially uninterruptive interprocess process element changing.

402. A method of multiformative manufacture as in clause 400, or any other clause, wherein said step of interprocess process element changing comprises the step of no-reset process element changing.

403. A method of multiformative manufacture as in clause 402, or any other clause, wherein said step of no-reset process element changing comprises the step of no-reset differential process element changing.

404. A method of multiformative manufacture as in clause 399, or any other clause, wherein said step of substantially uninterruptively changing comprises the step of substantially only mechanical change activity interruptively changing.

405. A method of multiformative manufacture as in clause 399, or any other clause, wherein said step of substantially uninterruptively changing comprises the step of interruption minimization changing.

406. A method of multiformative manufacture as in clause 405, or any other clause, wherein said step of interruption minimization changing comprises the step of automatic interruption minimization changing.

407. A method of multiformative manufacture as in clause 405, or any other clause, wherein said step of interruption minimization changing comprises the step of substantially only mechanical change activity interruptively changing.

408. A method of multiformative manufacture as in any of clauses 363 or 380, or any other clause, wherein said step of changing comprises the step of interprocess process element changing.

409. A method of multiformative manufacture as in clause 408, or any other clause, wherein said step of controlling comprises the steps of: controlling action of multiple process elements; and substantially uninterruptive interprocess process element changing.

410. A method of multiformative manufacture as in clause 408, or any other clause, wherein said step of interprocess process element changing comprises the step of no-reset process element changing.

411. A method of multiformative manufacture as in clause 410, or any other clause, wherein said step of no-reset process element changing comprises the step of no-reset differential process element changing.

412. A method of multiformative manufacture as in clause 400, or any other clause, wherein said step of interprocess process element changing comprises the step of utilizing a common driver for said second formative process capability.

413. A method of multiformative manufacture as in clause 412, or any other clause, wherein said step of utilizing a common driver for said second formative process capability comprises the step of utilizing common coordinates for said second formative process capability.

414. A method of multiformative manufacture as in clause 412, or any other clause, wherein said step of utilizing a common driver for said second formative process capability comprises the step of coordinate transforming.

415. A method of multiformative manufacture as in clause 414, or any other clause, wherein said step of coordinate transforming comprises the step of coordinate aliasing.

416. A method of multiformative manufacture as in clause 363, or any other clause, wherein said step of substantially uninterruptively changing comprises the step of process element change accommodating.

417. A method of multiformative manufacture as in any of clauses 363 or 416, or any other clause, wherein said step of substantially uninterruptively changing comprises the step of universally controlling positioning of said process elements.

418. A method of multiformative manufacture as in clause 417, or any other clause, wherein said step of universally controlling positioning of said process elements comprises the step of movement transforming.

419. A method of multiformative manufacture as in clause 418, or any other clause, wherein said step of movement transforming comprises the step of coordinate aliasing.

420. A method of multiformative manufacture as in clause 416, or any other clause, wherein said step of process element change accommodating comprises the step of interprocess process element changing.

421. A method of multiformative manufacture as in clause 416, or any other clause, wherein said step of process element change accommodating comprises the step of no-reset process element changing.

422. A method of multiformative manufacture as in clause 420, or any other clause, wherein said step of interprocess process element changing comprises the step of no-reset process element changing.

423. A method of multiformative manufacture as in clause 416, or any other clause, wherein said step of process element change accommodating comprises the step of interprocess process element changing.

424. A method of multiformative manufacture as in clause 416, or any other clause, wherein said step of process element change accommodating comprises the step of no-reset process element changing.

425. A method of multiformative manufacture as in clause 423, or any other clause, wherein said step of interprocess process element changing comprises the step of no-reset process element changing.

426. A method of multiformative manufacture as in clause 363, or any other clause, wherein said step of substantially uninterruptively changing to a second function formative process element comprises the step of substantially uninterruptively changing to a dissimilar function formative process element.

427. A method of multiformative manufacture as in any of clauses 363 or 426, or any other clause, wherein said step of substantially uninterruptively changing to a second function formative process element comprises the step of substantially uninterruptively changing to a dissimilar manufacturer formative process element.

428. A method of multiformative manufacture as in clause 363, or any other clause, wherein said step of substantially uninterruptively changing to a second function formative process element comprises the step of substantially uninterruptively changing to a dissimilar function material removal formative process element.

429. A method of multiformative manufacture as in clause 363, or any other clause, wherein said step of substantially uninterruptively changing to a second function formative process element comprises the step of substantially uninterruptively changing to a dissimilar function additive manufacturing formative process element.

430. A method of multiformative manufacture as in clause 363, or any other clause, wherein said step of substantially uninterruptively changing to a second function formative process element comprises the step of establishing a combination of one or more material removal heads and one or more additive manufacturing heads.

431. A method of multiformative manufacture as in clause 380, or any other clause, wherein said step of establishing a plurality of formative process capabilities comprises the step of establishing a plurality of dissimilar function formative process capabilities.

432. A method of multiformative manufacture as in any of clauses 380 or 431, or any other clause, wherein said step of establishing a plurality of formative process capabilities comprises the step of establishing a plurality of dissimilar manufacturer heads.

433. A method of multiformative manufacture as in clause 380, or any other clause, wherein said step of establishing a plurality of formative process capabilities comprises the step of establishing a plurality of dissimilar function material removal heads.

434. A method of multiformative manufacture as in clause 380, or any other clause, wherein said step of establishing a plurality of formative process capabilities comprises the step of establishing a plurality of dissimilar additive manufacturing heads.

435. A method of multiformative manufacture as in clause 380, or any other clause, wherein said step of establishing a plurality of formative process capabilities comprises the step of establishing a combination of one or more material removal heads and one or more additive manufacturing heads.

436. A method of multiformative manufacture as in any of clauses 363 or 380, or any other clause, further comprising the step of peripheral component assuring.

437. A method of multiformative manufacture as in clause 436, or any other clause, further comprising the step of peripheral component warning.

438. A method of multiformative manufacture as in clause 437, or any other clause, further comprising the step of peripheral component sensing.

439. A method of multiformative manufacture as in clause 437, or any other clause, further comprising the step of providing peripheral component data.

440. A method of multiformative manufacture as in clause 436, or any other clause, wherein said step of peripheral component assuring comprises the step of automatically capturing one or more peripheral component drivers.

441. A method of multiformative manufacture as in clause 436, or any other clause, wherein said step of peripheral component assuring comprises the step of assuring consumable adequacy.

442. A method of multiformative manufacture as in any of clauses 363 or 380, or any other clause, further comprising the step of displaying formative process information.

443. A method of multiformative manufacture as in clause 442, or any other clause, wherein said step of displaying formative process information comprises a step selected from the group consisting of: the step of displaying item volume, the step of displaying estimated source material amount, the step of displaying source material amount, the step of displaying estimated build time, the step of displaying build time, and the step of displaying item weight.

444. A method of additive manufacture of a fabrication item comprising the steps of:
providing a fabrication support upon which an item can be formed;
establishing fabrication data;
supplying additive material to a formative process element;
positioning said formative process element relative to said fabrication support;
antecedent activity, postliminary formative control processing said fabrication data;
controlling said step of positioning said formative process element relative to said fabrication support in response to said step of antecedent activity, postliminary formative control processing; and
forming said fabrication item.

445. A method of additive manufacture as in clause 444, or any other clause, wherein said step of antecedent activity, postliminary formative control processing said fabrication data comprises the step of evaluating prior item formative processes.

446. A method of additive manufacture as in clause 445, or any other clause, wherein said step of supplying additive material to a formative process element comprises the step of supplying additive material to a photosolidification formative process element.

447. A method of additive manufacture as in clause 446, or any other clause, wherein said step of supplying additive material to a photosolidification formative process element comprises the step of supplying additive material to a bottom-up photosolidification formative process element.

448. A method of additive manufacture as in clause 447, or any other clause, further comprising the step of variantly repositioning at least one layer of said fabrication item based on said step of antecedent activity, postliminary formative control processing said fabrication data.

449. A method of additive manufacture as in clause 448, or any other clause, wherein said step of variantly repositioning said at least one layer of said fabrication item based on said step of antecedent activity, postliminary formative control processing said fabrication data comprises the step of item structure variant item layer repositioning.

450. A method of additive manufacture as in clause 449, or any other clause, wherein said step of item structure variant item layer repositioning comprises the step of responding to previous fabrication structural characteristics of said item being fabricated.

451. A method of additive manufacture as in clause 450, or any other clause, wherein said step of variantly repositioning said at least one layer of said fabrication item based on said step of antecedent activity, postliminary formative control processing said fabrication data comprises the step of layer surface area varying said layer reposition system.

452. A method of additive manufacture as in clause 450, or any other clause, wherein said step of variantly repositioning said at least one layer of said fabrication item based on said step of antecedent activity, postliminary formative control processing said fabrication data comprises the step of formation speed optimizing.

453. A method of additive manufacture as in any of clauses 450 or 452, or any other clause, wherein said step of variantly repositioning said at least one layer of said fabrication item based on said step of antecedent activity, postliminary formative control processing said fabrication data comprises the step of viscosity variant item layer repositioning.

454. A method of additive manufacture as in clause 453, or any other clause, wherein said step of variantly repositioning said at least one layer of said fabrication item based on said step of antecedent activity, postliminary formative control processing said fabrication data comprises a step selected from the group consisting of: variantly repositioning an item layer based on variables selected from a group consisting of: the step of variantly repositioning an item layer based on item layer area, the step of variantly repositioning an item layer based on fluid resistance, the step of variantly repositioning an item layer based on fluid viscosity, the step of variantly repositioning an item layer based on item mechanical support, and the step of variantly repositioning an item layer based on item structural integrity.

455. A method of additive manufacture as in clause 444, or any other clause, wherein said step of antecedent activity, postliminary formative control processing said fabrication data comprises the step of configuring a coded computer processor as an antecedent activity, postliminary formative control processor.

456. A method of additive manufacture as in clause 444, or any other clause, wherein said step of antecedent activity, postliminary formative control processing said fabrication data comprises the step of transforming data representative of physical movements informative of product formation.

457. A method of additive manufacture as in clause 444, or any other clause, wherein said step of antecedent activity, postliminary formative control processing said fabrication data comprises the step of transforming physical movement of product formation.

458. A method of additive manufacture as in clause 444, or any other clause, wherein said step of antecedent activity, postliminary formative control processing said fabrication data comprises the step of configuring particularized computer hardware to transform fabrication of the item.

459. A method of additive manufacture as in clause 444, or any other clause, wherein said step of antecedent activity, postliminary formative control processing said fabrication data comprises the step of configuring a processor to move source material in a different manner than that specified in initial movement instructions.

460. A method of additive manufacture as in clause 444, or any other clause, wherein said step of antecedent activity, postliminary formative control processing said fabrication data providing computer-readable program instructions for movement transformation via a computer-readable storage medium.

461. A method of additive manufacture of a fabrication item comprising the steps of:
providing a fabrication support upon which an item can be formed;
inputting fabrication data;
supplying additive material to a photosolidification formative process element;
positioning said photosolidification formative process element relative to said fabrication support;
forming at least one layer of said fabrication item according to said fabrication data; and
variantly repositioning said at least one layer of said fabrication item based on said fabrication data.

462. A method of additive manufacture as in clause 461, or any other clause, further comprising the step of antecedent activity, postliminary formative controlling said step of variantly repositioning said at least one layer of said fabrication item based on said fabrication data.

463. A method of additive manufacture as in any of clauses 461 or 462, or any other clause, wherein said step of variantly repositioning said at least one layer of said fabrication item based on said fabrication data comprises the step of item structure variant item layer repositioning.

464. A method of additive manufacture as in clause 463, or any other clause, wherein said step of item structure variant item layer repositioning comprises the step of responding to previous fabrication structural characteristics of said item being fabricated.

465. A method of additive manufacture as in clause 461, or any other clause, wherein said step of variantly repositioning said at least one layer of said fabrication item based on said fabrication data comprises the step of source material variant item layer repositioning.

466. A method of additive manufacture as in any of clauses 461 or 462, or any other clause, wherein said step of source material variant item layer repositioning comprises the step of viscosity variant item layer repositioning.

467. A method of additive manufacture as in clause 461, or any other clause, further comprising the step of source material viscosity sensing.

468. A method of additive manufacture as in clause 461, or any other clause, wherein said step of variantly repositioning said at least one layer of said fabrication item based on said fabrication data comprises the step of configuring a coded computer processor as a variant item layer reposition system processor.

469. A method of additive manufacture as in clause 461, or any other clause, wherein said step of variantly repositioning said at least one layer of said fabrication item based on said fabrication data comprises the step of transforming data representative of physical movements informative of product formation.

470. A method of additive manufacture as in clause 461, or any other clause, wherein said step of variantly repositioning said at least one layer of said fabrication item based on said fabrication data comprises the step of transforming physical movement of product formation.

471. A method of additive manufacture as in clause 461, or any other clause, wherein said step of variantly repositioning said at least one layer of said fabrication item based on said fabrication data comprises the step of configuring particularized computer hardware to transform fabrication of the item.

472. A method of additive manufacture as in clause 461, or any other clause, wherein said step of variantly repositioning said at least one layer of said fabrication item based on said fabrication data comprises the step of configuring a processor to move source material in a different manner than that specified in initial movement instructions.

473. A method of additive manufacture as in clause 461, or any other clause, wherein said step of variantly repositioning said at least one layer of said fabrication item based on said fabrication data comprises the step of providing computer-readable program instructions for movement transformation via a computer-readable storage medium.

474. A method of additive manufacture of a fabrication item comprising the steps of:
providing a fabrication support upon which an item can be formed;
inputting fabrication data;
establishing a plurality of additive material source configuration functionalities;
supplying a first additive material to a formative process element;
at least partially forming said fabrication item with said first additive material;
user reconfiguring to a second additive material;
supplying a second additive material to a formative process element; and
at least partially forming said fabrication item with said second additive material.

475. A method of additive manufacture as in clause 474, or any other clause, wherein said step of user reconfiguring to a second additive material comprises the step of user reconfiguring to any of said plurality of additive material source configuration functionalities.

476. A method of additive manufacture as in clause 475, or any other clause, wherein said step of user reconfiguring to any of said plurality of additive material source configuration functionalities comprises the step of responding to said step of user reconfiguring to a second additive material.

477. A method of additive manufacture as in clause 476, or any other clause, wherein said step of inputting fabrication data comprises the step of user providing fabrication information.

478. A method of additive manufacture as in clause 477, or any other clause, wherein said step of user reconfiguring to a second additive material comprises the step of automatic source material reconfiguring.

479. A method of additive manufacture as in clause 476, or any other clause, further comprising the step of source material viscosity sensing.

480. A method of additive manufacture as in clause 474, or any other clause, wherein said step of user reconfiguring to a second additive material comprises the step of configuring a coded computer processor as a user formative process control.

481. A method of additive manufacture as in clause 474, or any other clause, wherein said step of user reconfiguring to a second additive material comprises the step of transforming data representative of physical movements informative of product formation.

482. A method of additive manufacture as in clause 474, or any other clause, wherein said step of user reconfiguring to a second additive material comprises the step of transforming physical movement of product formation.

483. A method of additive manufacture as in clause 474, or any other clause, wherein said step of user reconfiguring to a second additive material comprises the step of configuring particularized computer hardware to transform fabrication of the item.

484. A method of additive manufacture as in clause 474, or any other clause, wherein said step of user reconfiguring to a second additive material comprises the step of configuring a processor to move source material in a different manner than that specified in initial movement instructions.

485. A method of additive manufacture as in clause 474, or any other clause, wherein said step of user reconfiguring to a second additive material comprises the step of providing computer-readable program instructions for movement transformation via a computer-readable storage medium.

As can be easily understood from the foregoing, the basic concepts of the present invention may be embodied in a variety of ways. It involves both manufacturing techniques as well as devices to accomplish the appropriate manufacturing. In this application, the manufacturing techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of an "input" should be understood to encompass disclosure of the act of "inputting"—whether explicitly discussed or not—and, conversely, were there effectively disclosure of the act of "inputting", such a disclosure should be understood to encompass disclosure of an "input" and even a "means for inputting." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed below or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

I. U.S. Patent Documents

| U.S. Pat. No. | Kind Code | Issue Date | Name |
|---|---|---|---|
| 4,263,647 | | 1981 Apr. 21 | Merrell, et al. |
| 4,403,302 | | 1983 Sep. 6 | Young, et al. |
| 4,408,299 | | 1983 Oct. 4 | Young |
| 4,466,770 | | 1984 Aug. 21 | Peroutky |
| 4,937,759 | | 1990 Jun. 26 | Vold |
| 5,288,209 | A | 1994 Feb. 22 | Therrien, et al. |
| 5,325,307 | | 1994 Jun. 28 | Akashi |
| 5,453,933 | | 1995 Sep. 26 | Wright, et al. |
| 5,529,473 | | 1996 Jun. 25 | Lawton, et al |
| 5,682,319 | | 1997 Oct. 28 | Boland, et al. |
| 5,682,453 | | 2012 Sep. 4 | Otsuki, et al. |
| 5,892,345 | | 1999 Apr. 6 | Olsen |
| 6,007,230 | | 1999 Dec. 28 | Beckett, et al. |
| 6,192,283 | | 2001 Feb. 20 | Holowko |
| 6,311,098 | | 2001 Oct. 30 | Higasayama |
| 6,317,646 | B1 | 2001 Nov. 13 | de Caussin, et al. |
| 6,547,995 | | 2003 Apr. 15 | Comb |
| 6,922,607 | | 2005 Jul. 26 | Yamazaki, et al. |
| 7,069,185 | | 2006 Jun. 27 | Wilson et al. |
| 7,334,970 | | 2008 Feb. 26 | Kozak |
| 7,450,127 | B2 | 2008 Nov. 11 | Hong, et al. |
| 7,599,813 | | 2009 Oct. 6 | Grupp |
| 7,665,200 | B1 | 2010 Feb. 23 | Shimooka |

-continued

| U.S. Pat. No. | Kind Code | Issue Date | Name |
|---|---|---|---|
| 7,824,001 | | 2010 May 11 | Fienup, et al. |
| 7,853,351 | | 2011 Jan. 11 | Otsuki, et al. |
| 8,509,940 | | 2013 Aug. 13 | Gu, et al. |
| 8,554,502 | | 2013 Oct. 8 | Hon, et al. |
| 8,573,097 | | 2013 Nov. 5 | Dixon, et al. |
| 8,644,978 | | 2014 Feb. 4 | Heath, et al. |
| 8,676,372 | | 2014 Sep. 18 | Bolin, et al. |
| 8,678,805 | | 2014 Mar. 25 | Vemeer, et al. |
| 8,688,258 | | 2014 Apr. 1 | Miller |
| 8,712,577 | | 2014 Apr. 29 | Gu, et al. |
| 8,719,212 | | 2014 May 6 | Khoukhi |
| 8,736,212 | | 2014 May 27 | Sandhu, et al. |
| 8,761,918 | | 2014 Jun. 24 | Silverbrook |
| 8,761,920 | | Jun. 24, 2014 | Gu, et al. |
| 8,777,602 | | 2014 Jul. 15 | Vemeer, et al. |
| 8,807,721 | B2 | 2014 Aug. 19 | Nozawa, et al. |
| 8,810,122 | | 2014 Aug. 19 | Foret |
| 8,814,770 | | 2014 Aug. 26 | Schmauder |
| 8,815,141 | | 2014 Aug. 26 | Swanson, et al. |
| 8,819,228 | | 2014 Aug. 26 | Ramamurthy |
| 8,821,084 | | 2014 Sep. 2 | Chen |
| 8,824,777 | B2 | 2014 Sep. 2 | Choi, et al. |
| 8,827,684 | | 2014 Sep. 9 | Schumacher, et al |
| 8,832,505 | | 2014 Sep. 9 | Fryman, et al. |
| 8,836,988 | | 2014 Sep. 16 | Gravely, Jr. et al. |
| 8,838,682 | | 2014 Sep. 16 | Gerdes, et al. |
| 8,260,453 | | 2012 Sep. 4 | Otsuki, et al. |

II. U.S. Patent Application Publications

| Pub No. | Kind Code | Issue Date | Name |
|---|---|---|---|
| 20020068990 | A1 | 2002 Jun. 6 | Yamazaki, et al. |
| 20030033050 | A1 | 2003 Feb. 13 | Yutkowitz |
| 20030050725 | A1 | 2003 Mar. 13 | Dirnfeldner, Rainer |
| 20030114954 | A1 | 2003 Jun. 19 | Inagaki, et al. |
| 20030120376 | A1 | 2003 Jun. 26 | Shibata, et al. |
| 20030192865 | A1 | 2003 Oct. 16 | Cole, et al. |
| 20030204283 | A1 | 2003 Oct. 30 | Picard, et al. |
| 20040181307 | A1 | 2004 Sep. 16 | Hirai, et al. |
| 20050154488 | A1 | 2005 Jul. 14 | Esterling |
| 20060151445 | A1 | 2006 Jul. 13 | Schneider |
| 20070070038 | A1 | 2007 Mar. 29 | Hoffberg |
| 20080113293 | A1 | 2008 May 15 | Shkolnik, et al. |
| 20080231731 | A1 | 2008 Sep. 25 | Hull, et al. |
| 20080234857 | A1 | 2008 Sep. 25 | Endo, et al. |
| 20090112357 | A1 | 2009 Apr. 30 | Hammond, et al. |
| 20090267269 | A1 | 2009 Oct. 29 | Lim, et al. |

III. Foreign Patent Documents

| Foreign Document Number | Country Code | Kind Code | Publication Date | Name |
|---|---|---|---|---|
| WO2008/120183 | IL | A1 | 2008 Oct. 9 | Napadensky |
| EP2699407 | IB | A1 | 2012 Oct. 6 | di Levico |

Thus, the applicant(s) should be understood to have support to claim and make a statement of invention to at least: i) each of the manufacturing devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein. In addition and as to computer aspects and each aspect amenable to programming or other electronic automation, the applicant(s) should be understood to have support to claim and make a statement of invention to at least: xv) processes performed with the aid of or on a computer or microprocessor or controller as described throughout the above discussion, xvi) a programmable apparatus as described throughout the above discussion, xvii) a computer readable memory encoded with data to direct a computer comprising means or elements which function as described throughout the above discussion, xviii) a computer configured as herein disclosed and described, xix) individual or combined subroutines and programs as herein disclosed and described, xx) a carrier medium carrying computer readable code for control of a computer to carry out separately each and every individual and combined methods described herein or in any claim, xxi) a computer program to perform separately each and every individual and combined method or process step disclosed, xxii) a computer program containing all and each combination of means for performing each and every individual and combined step disclosed, xxiii) a storage medium storing each computer program disclosed, xxiv) a signal carrying a computer program disclosed, xxv) the related methods disclosed and described, xxvi) similar, equivalent, and even implicit variations of each of these systems and methods, xxvii) those alternative designs which accomplish each of the functions shown as are disclosed and described, xxviii) those alternative designs and methods which accomplish each of the functions shown as are implicit to accomplish that which is disclosed and described, xxix) each feature, component, and step shown as separate and independent inventions, and xxx) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall within the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A dynamic additive manufacturing system from which a fabrication item can be formed comprising:
    a fabrication support upon which an item can be formed;
    an additive material source;
    a formative process element;
    a layup movement system configured to effect positioning of said formative process element relative to said fabrication support;
    a movement control to which said layup movement system is responsive;
    a fabrication movement input from which fabrication movement information is provided; and
    a movement transformation processor transformatively responsive to said fabrication movement input that transforms movement of said layup movement system from an initially determined series of left-right, fore-aft step motions that were determined to make the desired item to an altered series of better such movements that are determined to achieve a better end resulting fabricated item.

2. A dynamic additive manufacturing system as in claim 1 wherein said movement transformation processor transformatively responsive to said fabrication movement input comprises a command transformation processor transformationally responsive to fabrication instructions.

3. A dynamic additive manufacturing system as in claim 2 wherein said command transformation processor transformationally responsive to fabrication instructions comprises a proactive control processor evaluatively responsive to as yet unaccomplished item formative data.

4. A dynamic additive manufacturing system as in claim 1 wherein said movement transformation processor transformatively responsive to said fabrication movement input comprises a transformant instruction generator.

5. A dynamic additive manufacturing system as in claim 1 wherein said fabrication movement input from which fabrication movement information is provided comprises initial movement instructions and wherein said movement transformation processor transformatively responsive to said fabrication movement input comprises altered movement instructions to control said movement system.

6. A dynamic additive manufacturing system as in claim 5 wherein said altered movement instructions to control said movement system comprise approximate movement instructions.

7. A dynamic additive manufacturing system as in claim 6 wherein said approximate movement instructions comprise positionally variant movement instructions.

8. A dynamic additive manufacturing system as in claim 7 wherein said approximate movement instructions comprise deviation tolerance movement instructions.

9. A dynamic additive manufacturing system as in claim 5 wherein said altered movement instructions to control said movement system comprise velocity configured movement instructions.

10. A dynamic additive manufacturing system as in any of claims 5, 6, or 8, wherein said altered movement instructions to control said movement system comprise curvilinear movement instructions.

11. A dynamic additive manufacturing system as in claim 4 wherein said transformant instruction generator comprises a velocity optimized movement generator.

12. A dynamic additive manufacturing system as in claim 11 wherein said velocity optimized movement generator comprises a constant tangential velocity generator.

13. A dynamic additive manufacturing system as in claim 1 wherein said movement transformation processor transformatively responsive to said fabrication movement input comprises a specialized layup movement transformation processor.

* * * * *